US007868051B2

(12) United States Patent
Fukuta et al.

(10) Patent No.: US 7,868,051 B2
(45) Date of Patent: Jan. 11, 2011

(54) SEPARATION MEMBRANE FOR FUEL BATTERY AND PROCESS FOR PRODUCING THE SAME

(75) Inventors: Kenji Fukuta, Yamaguchi (JP); Takenori Isomura, Yamaguchi (JP); Masayuki Kishino, Yamaguchi (JP)

(73) Assignee: Tokuyama Corporation, Yamaguchi (JP)

( * ) Notice: Subject to any disclaimer, the term of this patent is extended or adjusted under 35 U.S.C. 154(b) by 692 days.

(21) Appl. No.: 11/574,937

(22) PCT Filed: Sep. 9, 2005

(86) PCT No.: PCT/JP2005/017085

§ 371 (c)(1),
(2), (4) Date: Dec. 18, 2007

(87) PCT Pub. No.: WO2006/028292

PCT Pub. Date: Mar. 16, 2006

(65) Prior Publication Data

US 2008/0226960 A1    Sep. 18, 2008

(30) Foreign Application Priority Data

Sep. 10, 2004   (JP)   ............................. 2004-263708
Sep. 27, 2004   (JP)   ............................. 2004-280212

(51) Int. Cl.
*C08J 5/22*         (2006.01)
(52) U.S. Cl. ....................................................... 521/27
(58) Field of Classification Search .................... 521/27
See application file for complete search history.

(56) References Cited

U.S. PATENT DOCUMENTS 4,865,930 A * 9/1989 Kindler et al. ............... 429/314
6,689,501 B2 * 2/2004 Stone et al. ................. 429/483

FOREIGN PATENT DOCUMENTS

| JP | 64 22932 A | 1/1989 |
|---|---|---|
| JP | 09 235399 | 9/1997 |
| JP | 11 135137 A | 5/1999 |
| JP | 11 310649 | 11/1999 |
| JP | 2001 135328 A | 5/2001 |
| JP | 2001 167775 | 6/2001 |
| JP | 2002 338721 | 11/2002 |
| JP | 2003 535940 A | 12/2003 |
| JP | 2004 131533 | 4/2004 |
| JP | 2004 217921 | 8/2004 |
| WO | 00 44816 | 8/2000 |
| WO | 01 94450 A2 | 12/2001 |

* cited by examiner

*Primary Examiner*—Bernard Lipman
(74) *Attorney, Agent, or Firm*—Norris McLaughlin & Marcus, P.A.

(57) ABSTRACT

There are disclosed a membrane for a fuel cell in which voids in a porous membrane are filled with a crosslinking type ion exchange resin having both cation-exchange group and anion-exchange group via a covalent bond, wherein the ion exchange resin has ion-exchange groups with either polarity more than ion-exchange groups with the opposite polarity and at least 40% of the ion-exchange groups of the opposite polarity form ion complexes with the ion-exchange groups of the major polarity, as well as a producing process therefor.

23 Claims, 2 Drawing Sheets

US 7,868,051 B2

SEPARATION MEMBRANE FOR FUEL BATTERY AND PROCESS FOR PRODUCING THE SAME

TECHNICAL FIELD

The present invention relates to a membrane for a fuel cell where a crosslinked ion exchange resin is dispersed in a porous membrane, and a process for producing the same.

BACKGROUND OF THE INVENTION

An ion exchange membrane is widely used as a membrane for cells such as solid polymer type fuel cells, redox flow cells and zinc-bromine cells and as a membrane for dialysis. A solid polymer type fuel cell comprising an ion exchange membrane as an electrolyte is one of generation systems which take out chemical energy generated from a reaction between continuously supplied fuel and an oxidizing agent as electric power. The generation system is clean and highly efficient. Importance of this generation system has been recently grown in the fields of automobiles, home electric appliances and portable devices because of its operability at a low temperature and possibility of size reduction.

The solid polymer type fuel cell is generally constituted of a membrane made of a proton-conductive solid polymer acting as an electrolyte and a fuel chamber and an oxidizing-agent chamber separated by the membrane. A gas diffusion electrode carrying a catalyst is joined to both sides of the membrane. Fuel such as hydrogen gas or methanol is supplied into a chamber (fuel chamber) having one of the gas diffusion electrodes whereas oxygen or an oxygen-containing gas such as air is supplied as an oxidizing agent into a chamber (oxidizing-agent chamber) having the other gas diffusion electrode. An external load circuit is connected between the gas diffusion electrodes to supply power to the external load circuit, which allows the system to function as a fuel cell.

Among proton-conductive type fuel cells, a direct methanol type fuel cell directly using methanol as a fuel is easily handled because the fuel used is liquid and the fuel is inexpensive. Thus, a direct methanol type fuel cell is expected to be used as a relatively lower output power source for portable devices.

The basic structure of a conventional direct methanol type fuel cell is shown in FIG. 1. In FIGS. 1, 1a, 1b are cell partition walls which are disposed facing each other; 2 is a fuel flow hole as a groove formed in the inner surface of the partition wall 1a; 3 is an oxidizing gas flow hole as a groove formed in the inner surface of the partition wall 1b; 6 is a solid polymer electrolyte membrane having a fuel-chamber side diffusion electrode 4 in one side and an oxidizing-agent chamber side gas diffusion electrode 5 in the other side. The fuel chamber 7 and the oxidizing-agent chamber 8 are electrically insulated from each other by the solid polymer electrolyte membrane 6.

In this direct methanol type fuel cell, methanol is supplied to the fuel chamber 7. The supplied methanol produces protons (hydrogen ions) and electrons by the action of the fuel-chamber side diffusion electrode 4. The protons generated move through the solid polymer electrolyte 6 to the oxidizing-agent chamber 8 in the other side, where the protons are reacted with oxygen in the air or oxygen gas to produce water. On the other hand, the electrons produced on the fuel-chamber side diffusion electrode 4 move through the external load circuit (not shown) to the oxidizing-agent chamber side gas diffusion electrode (5), during which electric energy is applied to the load circuit.

In a direct methanol type fuel cell having such a structure, a cation exchange membrane is generally used as a membrane. The cation exchange membrane must meet the requirements for properties such as a low electric resistance, higher physical strength and lower permeability of methanol used as a fuel.

For example, when a cation exchange membrane exhibiting higher methanol permeability is used as a membrane for a fuel cell, diffusion of methanol in the fuel chamber into the oxidizing-agent chamber side cannot be completely prevented, leading to an insufficient battery output.

A perfluorocarbon sulfonic acid membrane, typically Nafion™, has been frequently used as a cation exchange membrane used as a membrane for a direct methanol type fuel cell. This membrane exhibits excellent chemical stability. Its physical strength is not adequately high to form a thin membrane, so that electric resistance of the membrane cannot be reduced.

In addition, since methanol is used as a fuel, the perfluorocarbon sulfonic acid film is deformed due to considerable expansion with methanol. Furthermore, such membrane expansion further accelerates diffusion of methanol into the oxidizing agent chamber side. Furthermore, a perfluorocarbon sulfonic acid film is expensive.

For solving the above problems, there have been investigated, in place of a fluorine-containing polymer such as a perfluorocarbon sulfonic acid, various cation-exchange membranes comprising a hydrocarbon polymer as a basic material. For example, Japanese Patent Applications Laid-open No. 2001-135328 and 1999-310649 have proposed a technique by that a particular method, a polyolefin or fluororesin porous membrane as a base member is impregnated with a monomer having a functional group to which a cation-exchange group can be introduce, the impregnated monomer is polymerized and then a cation-exchange group is introduced to the resulting polymer. These references have described that the process can provide a cation-exchange membrane having a lower electric resistance and hydrogen-gas permeability.

However, even in a cation-exchange membrane prepared by such a method, methanol permeability cannot be adequately minimized when it is used as a membrane for a direct methanol type fuel cell. As a result, there still remains the problem of reduction in battery performance due to diffusion of methanol from the fuel chamber side to the oxidizing-agent chamber side. Furthermore, when changing a membrane composition for minimizing methanol permeability, an electric resistance of the membrane increases, leading to reduction in a battery output.

We have proposed an ion exchange membrane having an additional layer consisting of an inorganic filler and ion exchange membrane on a porous membrane as a base member, as a membrane for a fuel cell with lower methanol permeability (Japanese Patent Application Laid-open No. 2004-217921). The ion exchange membrane cannot, however, adequately minimize methanol permeability.

In addition, there have been described that a so-called polyion complex membrane as a mixture of a polymer having an intramolecular acidic group such as a sulfonated polyether ether ketone and a polymer having an intramolecular basic group such as polybenzimidazole is used as a membrane for a direct methanol type fuel cell (Japanese Patent Application Laid-open No. 2003-535940). This polyion complex membrane has been conventionally investigated for the use in a membrane for a fuel cell in which hydrogen gas is used as a fuel. The reference has described that the membrane exhibits higher proton conductivity, high-temperature stability and lower methanol permeability.

Our investigation has confirmed that the membrane is more effective to some extent in improving stability against swelling with methanol and in reducing methanol permeability in comparison with a membrane made of each polymer alone. However, it has been demonstrated that since the membrane is a so-called non-crosslinked membrane without a covalent-bond bridge, it is still unsatisfactory in minimization of methanol permeability.

The content of an acidic or basic group in a polyion complex membrane might be reduced to minimize methanol permeability. This method, however, lead to reduction in proton conductivity in the polyion complex membrane.

Furthermore, in the preparation of the above polyion complex membrane, the acidic-group containing polymer and the basic-group containing polymer must be mixed, during which precipitation occurs. For avoiding the problem in the above method, a mixed solution of these polymers is first made basic before membrane forming and then the resulting membrane is treated with an acid. The process is, however, troublesome.

It is also known that a crosslinking type cation-exchange resin such as a sulfonated styrene-divinylbenzene resin is impregnated with a polymer having an anion-exchange group such as polybenzimidazole to form a polyion complex membrane (Japanese Application Laid-open No. 2001-167775). However, in such a membrane, the higher a crosslinking degree in the crosslinking type cation-exchange resin is, the less freedom of movement of the impregnated polymer having an anion-exchange group in the membrane is, so that the amount of ion complexes formed is reduced and thus the membrane cannot be sufficiently effective.

Furthermore, a polybenzimidazole type polymer having a benzimidazole structure in a motif in a principal chain, whose principal chains can be crosslinked has been used as an ion exchange resin which is to be a material for a membrane for a fuel cell because of, for example, its excellent heat resistance. For further improving its heat resistance, it has been proposed that a sulfonic acid group is introduced to a benzene ring coexisting in the principal chain (Japanese Patent Application Laid-open No. 2004-131533). In such a polybenzimidazole type polymer, an acidic group such as a sulfonic acid group can be introduced via a hydrocarbon group to an NH group in an imidazole ring in its principal chain, and thus it has been proposed that a membrane for a fuel cell is produced using an ion exchange resin thus prepared by introducing an acidic group (Japanese Patent Application Laid-open No. 2002-535467).

It can be assumed that in a polybenzimidazole type polymer to which the above acidic group has been introduced, the introduced acidic group and the imidazole ring in the principal chain would form an ion complex to some extent. However, in such a structure where an imidazole ring is contained in a principal chain, freedom in a reaction is too low to form the ion complex in a high yield. Even a membrane for a fuel cell formed by such a procedure cannot, therefore, reduce methanol permeability to a sufficient level.

As described above, there are no conventional cation-exchange membranes used for a membrane in a direct methanol type fuel cell exhibiting both low methanol permeability and high proton conductivity.

SUMMARY OF THE INVENTION

The present invention has been achieved for solving the above problems. Thus, an objective of this invention is to provide an ion exchange membrane exhibiting lower fuel permeability, particularly methanol permeability and higher proton conductivity; particularly, a cation-exchange membrane stably giving a high battery output when using as a membrane for a proton-conductive type fuel cell, in particular as a membrane for a direct methanol type fuel cell.

The inventors have intensely conducted investigation for solving the above problems. Consequently, we have found that methanol permeability in a membrane can be significantly reduced without increase in a membrane resistance to protons in the membrane by dispersing a crosslinking type cation-exchange resin in which ion complexes are formed in a high yield in voids of a porous membrane. The inventors have furthermore found a suitable process for producing such a membrane, achieving the present invention.

Specifically, the present invention provides a membrane for a fuel cell as an ion exchange membrane in which voids in a porous membrane are filled with a crosslinking type ion exchange resin having both cation-exchange group and anion-exchange group via a covalent bond, wherein the membrane has ion-exchange groups with either polarity more than ion-exchange groups with the opposite polarity and at least 40% of the ion-exchange groups of the opposite polarity form ion complexes with the ion-exchange groups with the ion-exchange groups of the major polarity.

The present invention includes the membrane wherein the ion exchange resin contained in the membrane for a fuel cell is a resin comprising crosslinked polymer chains in which both cation-exchange groups and anion-exchange groups are covalently bound in a random manner.

The present invention also includes the membrane wherein the ion exchange resin contained in the membrane for a fuel cell consists of a mixture of a resin comprising crosslinked polymer chains having covalently bound ion-exchange groups which are either of cation-exchange groups or anion-exchange groups and a resin comprising polymer chains having covalently bound ion-exchange groups with the opposite polarity to the ion-exchange groups in the above resin.

The present invention also provides a first producing process, that is, a process for producing a membrane for a fuel cell, comprising the steps of contacting a porous membrane with a polymerizable composition containing a polymerizable monomer in which cation-exchange-group introducible functional groups or cation-exchange groups are covalently bound, a polymerizable monomer in which anion-exchange-group introducible functional groups or anion-exchange groups are covalently bound, a crosslinking agent and a polymerization initiator to impregnate the voids in the porous membrane with the polymerizable composition; then polymerizing and curing the impregnated polymerizable composition; then introducing, if necessary, cation-exchange groups and/or anion-exchange groups to the cation-exchange-group or anion-exchange-group introducible functional groups such that ion-exchange groups with either polarity become more than ion-exchange groups with the opposite polarity.

Furthermore, the inventors have found that a membrane exhibiting significantly lower methanol permeability can be prepared by first forming a crosslinking type ion exchange resin, impregnating the resin with a polymerizable monomer having covalently bound ion-exchange group with the opposite polarity to form an ion complex and then polymerizing the polymerizable monomer, achieving the second producing process described below.

Specifically, the second producing process is a process for producing a membrane for a fuel cell comprising the steps of contacting a base ion-exchange membrane in which voids in a porous membrane are filled with a crosslinking type ion exchange resin having covalently bound cation-exchange groups or anion-exchange groups with a polymerizable monomer having covalently bound ion-exchange groups with the opposite polarity to that of the ion-exchange groups in the crosslinking type base ion-exchange membrane to impregnate the base ion-exchange membrane with the polymerizable monomer, and then polymerizing the impregnated polymerizable monomer.

A membrane for a fuel cell of the present invention has a structure where an ion exchange resin made of a crosslinking type polyion complex is dispersed in a porous membrane. It, therefore, has significantly lower methanol permeability than a conventional polyion complex membrane as a simple mixture of a non-crosslinking type cation-exchangeable polymer and a non-crosslinking type anion-exchangeable polymer. Furthermore, the ion complex is formed in a higher yield and exhibits improved methanol non-permeability in comparison with a membrane prepared using a crosslinking type ion exchange resin in which acidic groups are introduced to, for example, a polybenzimidazole polymer.

Furthermore, a membrane of the present invention comprises a crosslinking type resin, resulting in less swelling with methanol. Thus, to the membrane can be introduced a large number of cation-exchange group and anion-exchange groups. As a result, the membrane of the present invention has higher proton conductivity. Such a configuration can provide a membrane for a direct methanol type fuel cell meeting the requirements of both high methanol non-permeability and high proton conductivity, which has not been achieved by the prior art. In addition, according to the producing process of the present invention, the above excellent membrane for a direct methanol type fuel cell can be provided at low cost by a convenient producing process.

A direct methanol type fuel cell comprising a membrane for a fuel cell of the present invention has a lower internal resistance. Furthermore, it can inhibit crossover that methanol as a fuel for the fuel cell moves from a fuel chamber to an oxidizing-agent chamber to give a higher battery output. As described above, the present invention is a very useful technique for producing a direct methanol fuel cell with a high output.

According to the first producing process of the present invention, an ion complex is formed in a high yield during preparing a polymerizable composition or introducing ion-exchange groups after producing a membrane. The amount of the ion complex formed is substantially higher than that for a polyion-complex crosslinking type ion exchange membrane used as a conventional membrane for a fuel cell. As a result, a membrane thus formed exhibits considerably excellent methanol non-permeability and proton-conductivity.

According to the second producing process of the present invention, an ion exchange resin is first impregnated with a polymerizable monomer having covalently bound ion-exchange groups. Next, an ion complex is formed from the above ion-exchange groups in the ion exchange resin and the ion-exchange groups in the polymerizable monomer and then the polymerizable monomer is polymerized. In this producing process, the polymerizable monomer having the ion-exchange groups with the opposite polarity permeate into the ion exchange resin while they can move around freely, and forms an ion complex with the ion-exchange groups in the resin, so that the yield can be further increased. Furthermore, since the base ion-exchange membrane is formed before forming the ion complex, a large number of the ion-exchange groups can be introduced to the ion exchange resin constituting the base ion-exchange membrane. Thus, a membrane can be manufactured, which has a larger number of the ion-exchange groups than that by the first producing process where a membrane is formed by the above copolymerization.

Figure 1:
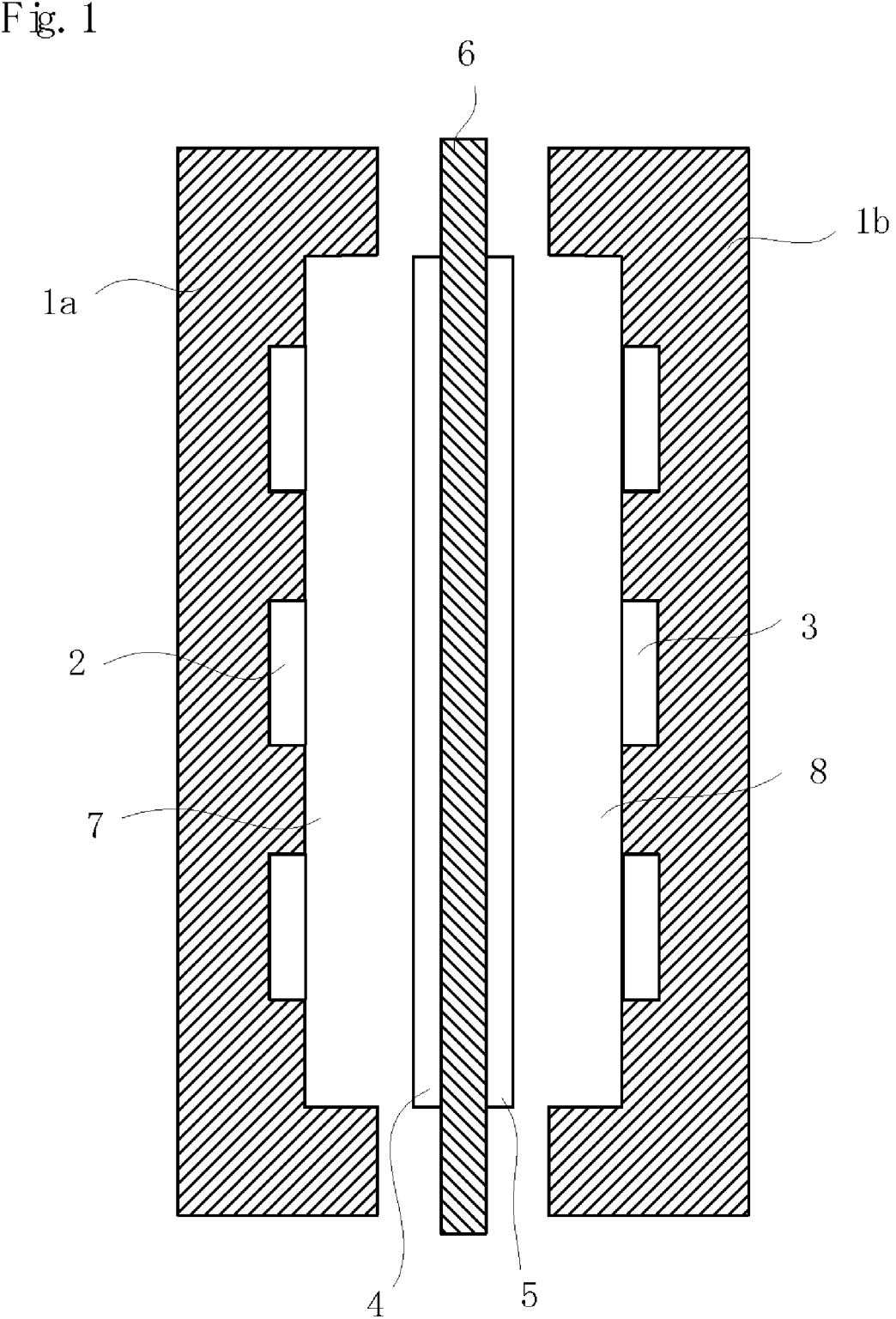
FIG. 1 is a conceptual view illustrating a basic structure of a solid polymer type fuel cell.
Figure 2:
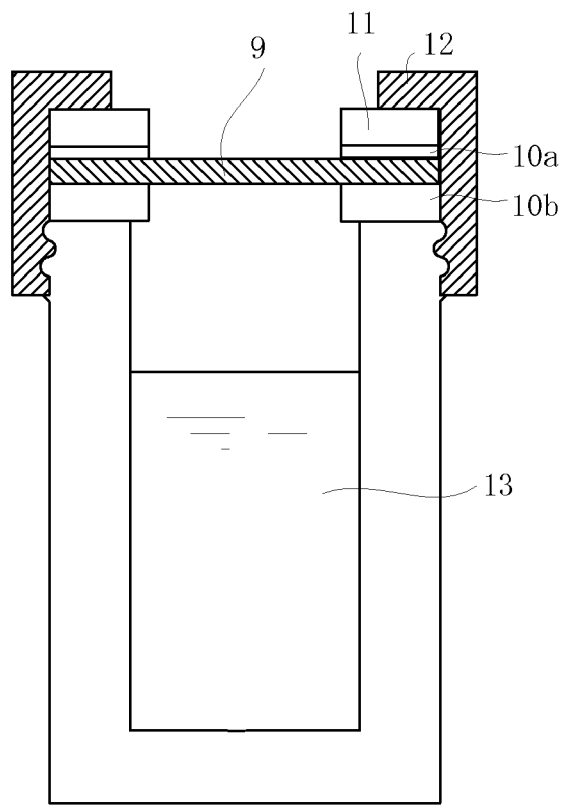
FIG. 2 is a conceptual view of a cell used for determination of a methanol permeability.

In the drawings, 1a and 1b denote a cell partition wall; 2 denotes a fuel gas flow hole; 3 denotes an oxidizing-agent gas flow hole; 4 denotes a fuel-chamber side gas diffusion electrode; 5 denotes an oxidizing-agent chamber side gas diffusion electrode; 6 denotes a solid polymer electrolyte; 7 denotes a fuel chamber; and 8 denotes an oxidizing-agent chamber.

9 denotes an ion exchange membrane; 10a, 10b denotes a polytetrafluoroethylene packing; 11 denotes a rubber packing; 12 denotes a cap with an opening; 13 denotes methanol; and 14 denotes a glass container.

100 denotes a membrane for a fuel cell; 32 denotes a porous membrane; 34 denotes a void; and 36 denotes an ion exchange resin.

DETAILED DESCRIPTION OF PREFERRED EMBODIMENTS

Membrane for a Fuel Cell

Figure 3:
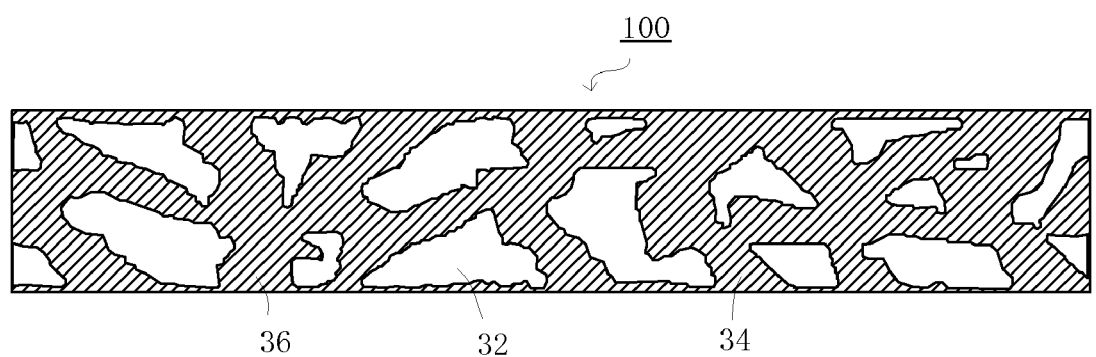
FIG. 3 is a conceptual view illustrating an embodiment of a membrane for a fuel cell according to the present invention.

FIG. 3 is a conceptual view illustrating an embodiment of a membrane for a fuel cell according to the present invention. As shown in FIG. 3, a membrane for a fuel cell 100 of the present invention consists of a porous membrane 32 and an ion exchange resin 36 filling voids 34 in the porous membrane 32.

The ion exchange resin 36 filling the membrane for a fuel cell 100 of the present invention has both cation-exchange groups and anion-exchange groups which are covalently bound. It is, therefore, different from a membrane having both ion-exchange groups with the opposite polarities by, as post-treatment, adsorption of a low-molecular-weight compound having an ion-exchange group with the opposite polarity to the ion-exchange group in the ion exchange resin for forming an ion complex.

In a membrane of the present invention, both cation-exchange groups and anion-exchange groups are strongly bound via a covalent bond to a matrix (the part in the ion exchange resin remaining after removing the ion-exchange groups) in the resin. Thus, the effects of the ion complex formed by these ion-exchange groups can be stably achieved (hereinafter, the state that an ion exchange resin or polymerizable monomer has an ion-exchange group via a covalent bond may be simply referred to as "having an ion-exchange group").

Furthermore the ion exchange resin 36 is a crosslinking type ion exchange resin containing either of cation-exchange groups or anion-exchange groups more than the other in amount.

When in the ion exchange resin 36 there are more cation-exchange groups exhibiting cation-exchange ability in an aqueous solution than anion-exchange groups exhibiting anion-exchange ability, the ion exchange resin 36 behaves as a cation-exchange resin as a total system. When in the ion exchange resin 36, there are less cation-exchange groups exhibiting cation-exchange ability in an aqueous solution than anion-exchange groups exhibiting anion-exchange ability, the ion exchange resin 36 behaves as an anion exchange resin as a total system.

The membrane for a fuel cell 100 of the present invention can be used as membranes for various types of fuel cells; particularly, it is preferable as a membrane for a direct methanol type fuel cell because an electric resistance to protons can be particularly reduced in a membrane filled with an ion exchange resin having more cation-exchange groups than anion-exchange groups. There will be described a membrane of the present invention, focusing on such a fuel cell membrane having a particularly lower electric resistance to protons because it has more cation-exchange groups than anion-exchange groups.

A membrane filled with an ion exchange resin having more anion-exchange groups than cation-exchange groups exhibits low methanol permeability while having proton conductivity, so that it is useful as the membrane for a direct methanol type fuel cell. However, since the membrane can particularly reduce an electric resistance to hydroxide ions rather than proton resistance, it can be suitably used as the hydroxide-ion conductive type fuel cell membrane.

The phrase, "the ion exchange resin 36 is of a crosslinking type" or similar expressions as used herein, mean that the ion exchange resin has a bridge structure via a covalent bond such as a carbon-carbon bond and a carbon-oxygen bond. A resin in which crosslinking is formed only by ion or hydrogen bonding is not included in crosslinking type resins of the present invention. In ion or hydrogen bonding as described above, its binding properties vary, depending on environmental ion strength.

The cation-exchange groups and the anion-exchange groups may be selected from known cation-exchange and anion-exchange groups without particular limitations. Specific examples of cation-exchange groups include sulfonic acid group, carboxylic acid group and phosphonic acid group. Sulfonic acid group which is a strongly acidic group is particularly preferable in terms of providing a membrane with higher proton conductivity.

Examples of anion-exchange groups include primary to tertiary amino groups, quaternary ammonium group, pyridyl group, imidazolyl group, quaternary pyridinium group and quaternary imidazolium group.

These ion-exchange groups have a primary to tertiary nitrogen atom as a nitrogen atom having ion-exchanging ability. Such a nitrogen atom can be coordinated by at least one proton (hydrogen ion). The coordinating ability for a proton allows for a membrane with lower methanol permeability and higher proton conductivity.

The cation-exchange and the anion-exchange groups form an ion complex in the ion exchange resin. Thus, in the ion exchange resin there are covalent-bonding bridges formed by a crosslinking agent and ion-bonding bridges formed by the ion complex. As a result, an apparent crosslinking density is considerably high. In the ion exchange resin having such a higher crosslinking density, movement of methanol is limited. On the other hand, protons can easily move in the ion exchange resin by repeating addition to and elimination from these both ion-exchange groups. These mechanisms probably contribute to give the ion exchange resin exhibiting lower methanol permeability and higher proton conductivity.

The amount of the ion complex formed is a significant characteristic in a membrane for a fuel cell of the present invention. Specifically, on the basis of the number of minor groups with one polarity of cation-exchange and anion-exchange groups, at least 40% of them form an ion complex with major ion-exchange groups with the opposite polarity (hereinafter, the amount of an ion complex as defined above is simply referred to as "ion-complex amount"). Preferably at least 60%, most preferably at least 80% of them form an ion complex. It is the present invention that provides for the first time a membrane for a fuel cell having such a high ion-complex amount in a crosslinking type ion exchange resin where both cation-exchange groups and anion-exchange groups are covalently bound.

Since an ion complex is formed in such a high yield, a membrane for a fuel cell of the present invention can prominently exhibit the effect of lowering methanol permeability as described above. If an ion-complex amount is less than 40%, the effect of lowering methanol permeability is insufficient.

An ion-complex amount in an ion exchange membrane can be determined by the method described below. First, a fuel cell membrane of the present invention is subjected to elementary analysis to determine the amount of an element only derived from a cation-exchange group (for example, sulfur in a sulfonic acid group) and the amount of an element only derived from an anion-exchange group (for example, nitrogen in a pyridyl group). Then, the total amount of each exchange group in the membrane (including the amount involved in ion-complex formation) is calculated from the element amount thus determined. Next, an ion-exchange capacity of the fuel cell membrane is determined as usual. An ion-exchange group forming an ion complex does not act as an ion-exchange group. Thus, subtracting the amount of the ion-exchange group calculated from the actually-determined ion-exchange capacity from the total amount of the ion-exchange group in the membrane provide a difference, from which the ion-complex amount of the group can be then determined. In the present invention, a proportion of an ion complex formed based on the amount of minor ion-exchange groups with one polarity is determined from a ratio of an ion-complex amount to the amount of ion-exchange groups with the opposite polarity.

In determining the total amount of ion-exchange groups present in the membrane, the matrix resin constituting the membrane may contain all the elements constituting the ion-exchange groups to be measured. In such a case, a composition ratio of a polymerizable monomer polymerized during preparing the membrane is used to determine the amount of one characteristic element of the common elements contained in the matrix resin. Next, the amount in the matrix resin is subtracted from the amount of the element measured in the above elementary analysis to determine the total amount of the ion-exchange group to be measured.

Furthermore, when using an anion-exchange group having a primary to tertiary nitrogen atom as an anion-exchange group in a membrane for a fuel cell of the present invention as described above, movement of the protons in the ion exchange resin becomes easier while maintaining the state that the anion-exchange group and the cation-exchange group forms an ion complex. It may, as a result, exhibit further excellent proton conductivity as a membrane for a fuel cell. The anion-exchange group is most preferably a pyridyl group in the light of more prominently achieving the effect.

The anion-exchange group is most preferably an imidazolyl group in the light of achieving methanol non-permeability.

There are no limitations to the amount of the ion-exchange groups with a major polarity of the cation-exchange and the anion-exchange groups in the above ion exchange resin filling the voids in the porous membrane, but preferably 3.0 mmol/g-dry mass or more, particularly preferably 4.8 mmol/g-dry mass or more based on the ion exchange resin filling the voids in the porous membrane. The upper limit of the amount of the ion-exchange groups is, but not limited to, about 6.0 mmol/g-dry mass in the light of facility in production.

Furthermore, in the above ion exchange resin, it is preferable that the amount of low molecular-weight compounds derived from the polymerizable monomer having ion-exchange groups with the opposite polarity to the major ion-exchange groups (unreacted monomers, polymers with a low degree of polymerization and so on) is 0.05 mmol/g-dry mass or less, suitably 0.03 mmol/g-dry mass or less as the amount of the ion-exchange groups in the low molecular-weight compounds.

Here, the amount of the low molecular-weight compound can be determined by the method described below. First, a fuel cell membrane is subjected to elementary analysis to measure the amount of an element only derived from a minor ion-exchange group (for example, nitrogen in a pyridyl group) (when all of the constituting elements are contained in the matrix, the amount contained in the matrix is determined from the composition ratio of the polymerizable monomer constituting the ion exchange resin, which is then used in the subtraction calculation as described above), from which the amount of the ion-exchange group is determined. Next, the fuel cell membrane is immersed in a 0.5 mol/l-sodium hydroxide solution in a mixture of water-methanol (water: 50% by mass), to extract the low molecular-weight compound in the membrane. Again, the amount of the minor ion-exchange group in the membrane is measured by elementary analysis. The above extraction is repeated until the amount of the ion-exchange group becomes constant. Then, the amount of the low molecular-weight compound having the ion-exchange group with the opposite polarity to the major ion-exchange group is determined from a difference between the final amount of the ion-exchange group and the amount of the ion-exchange group before extraction.

In addition to such a method, the amount of the low molecular-weight compound can be determined by analyzing the extract in the sodium hydroxide solution by gel permeation chromatography. In the method, the low molecular-weight polymer from the polymerizable monomer having the ion-exchange group with the opposite polarity may be preliminarily prepared and a calibration curve for the low molecular-weight polymer may be used for quantitative analysis.

An ion exchange resin used in a membrane for a direct methanol type fuel cell preferably contain more cation-exchange groups than anion-exchange groups. If the anion-exchange groups are contained in an equal to or larger amount than the cation-exchange groups, a fuel cell output is lower than that for an ion exchange resin containing the cation-exchange groups in a larger amount. It would be because movement of protons would be limited in the ion exchange resin. An ion exchange resin for a direct methanol type fuel cell is preferably selected from the followings; cation-exchange membranes having more cation-exchange groups than anion-exchange groups in which a cation-exchange capacity as determined in the usual manner is preferably 0.1 to 3 mmol/g, more preferably 0.1 to 2 mmol/g, particularly preferably 0.3 to 1.5 mmol/g.

Herein, the amount of anion-exchange groups in the cation-exchange resin is preferably 0.1 to 3 mmol/g, more preferably 0.2 to 2 mmol/g, particularly preferably 0.5 to 1.5 mmol/g.

As described above, an ion exchange resin used in the present invention is a crosslinking type resin, that is, an ion exchange resin having covalently bonding bridges.

An ion exchange resin prepared by simply mixing a polymer having cation-exchange groups and a polymer having anion-exchange groups also form an ion complex. It, therefore, has ion-bonding bridges based on the ion complex. However, an ion exchange resin having only such ion-bonding bridges tends to be swollen when being in contact with methanol or water; in some extreme cases, it is dissolved. Such an ion exchange resin cannot, therefore, sufficiently inhibit methanol permeation.

A crosslinking type ion exchange resin is essentially insoluble in a solvent. Even when introducing a large amount of ion-exchange groups to an ion exchange resin, resin stability (insolubility in water or methanol) is not reduced. Therefore, an extremely large amount of ion-exchange groups can be introduced, resulting in considerably higher proton conductivity.

There are no particular restrictions to a crosslinking density in a crosslinking type ion exchange resin (due to covalent-bonding bridges), but there is tendency that the higher a crosslinking density is, the lower methanol permeability and the lower a crosslinking density is, the higher proton conductivity is.

A crosslinking density of the crosslinking type ion exchange resin is preferably almost equal to a crosslinking density obtained by mixing 100 moles of a given monofunctional polymerizable monomer with 0.1 to 40 moles, more preferably 1 to 10 moles of a bifunctional polymerizable monomer and polymerizing the mixture.

Of course, a method for preparing a crosslinking type ion exchange resin is not limited to the above method involving copolymerization of a bifunctional polymerizable monomer. For example, a method involving copolymerization of tri- or more functional polymerizable monomer may be used. An alternative method can be used, which involves forming a straight-chain polymer and then adding a monomer inducing a different style of chemical reaction from the polymerization reaction of the monomer used to form bridges between the straight polymer chains. Alternatively, making bridges by irradiation with UV ray or electron beam may be used. Crosslinking may be conducted by any of these known methods. For example, it is well-known that, for example, a linear polymer compound including a fluoro-resin such as polytetrafluoroethylene and an engineering plastic such as polyethersulfone is irradiated with UV ray or electron beam for initiating crosslinking to prepare a crosslinking type ion exchange resin.

There are no particular restrictions to the structure of the ion exchange resin, except that the matrix has the above crosslinking structure. That is, the ion exchange resin may have any matrix structure of known ion exchange resins having a crosslinking structure. A matrix in the ion exchange resin is preferably a resin having a structure essentially consisting of carbon and hydrogen in the light of producing cost reduction in comparison with a fluorine-containing matrix such as perfluorocarbonsulfonic acid.

The matrix may contain another element such as fluorine, chlorine, bromine, oxygen, nitrogen, silicon, sulfur, boron and phosphorous. The content is, however, preferably 40 mol % or less, more preferably 10 mol % or less to the total number of the atoms constituting the matrix (hereinafter, such an ion exchange resin is also referred to as a "hydrocarbon type ion exchange resin"). A particularly preferable matrix is a polystyrene type matrix prepared by copolymerizing a styrene type polymerizable monomer with a crosslinking monomer capable of copolymerizing with the styrene type monomer.

A membrane for a fuel cell of the present invention comprises a porous membrane as a base member and the ion exchange resin is heterogeneously dispersed in the voids in the porous membrane. Both surfaces of the porous membrane is communicated with each other via a continuous structure of the crosslinking type ion exchange resin filling the voids in the porous membrane, and through the crosslinking type ion exchange resin, protons move from one surface side to the other surface side of the membrane.

A membrane for a fuel cell having a porous membrane as a base member is mechanically reinforced by the porous membrane. The membrane can improve physical strength of the membrane for a fuel cell without reducing proton conductivity.

There are no particular restrictions to a porous membrane and any of known porous membranes can be used as long as it has fine pores with an average pore diameter of 0.01 to 2 μm and at least some of the fine pores communicate between the front and the rear surfaces.

A porosity (also referred to as "pore rate") of the porous membrane is preferably 20 to 95%, more preferably 30 to 90%. An air permeability (JIS P-8117) is preferably 1500 sec or less, particularly preferably 1000 sec or less. Its thickness is preferably 5 to 150 μm, more preferably 10 to 120 μm, particularly preferably 10 to 70 μm. Such a configuration leads to a membrane for a fuel cell exhibiting higher proton conductivity and higher physical strength.

A surface smoothness of the porous membrane is preferably 10 μm or less, more preferably 5 μm or less as a roughness index. Such a configuration leads to higher adhesiveness to a gas diffusion electrode, so that a membrane for a fuel cell with a higher output can be obtained.

If a porous membrane with an average pore diameter of 0.01 μm or less is used for preparing a membrane, the amount of the ion exchange resin is insufficient for filling the voids in the porous membrane, so that a membrane with high proton conductivity cannot be obtained. If a membrane is prepared using a porous membrane with an average pore diameter of 2 μm or more, a membrane with low methanol permeability cannot be obtained.

The porous membrane is not limited to a particular form and may be, but not limited to, a porous film, fabric, nonwoven fabric, paper or inorganic membrane. The material for the porous membrane is selected from, but not limited to, a thermoplastic resin composition, a thermosetting resin composition, an inorganic material and a mixture thereof. A thermoplastic resin composition is preferable as a material for the porous membrane. Using a thermoplastic resin may lead to easier production of a porous membrane and furthermore, advantageously higher adhesion strength to the above ion exchange resin.

Examples of the thermoplastic resin composition include polyolefin resins prepared by homopolymerizing or copolymerizing one or more α-olefin such as ethylene, propylene, 1-butene, 1-pentene, 1-hexene, 3-methyl-1-butene, 4-methyl-1-pentene and 5-methyl-1-heptene; vinyl chloride-based resins such as polyvinyl chloride, vinyl chloride-vinyl acetate copolymer, vinyl chloride-vinylidene chloride copolymer and vinyl chloride-olefin copolymer; fluororesins such as polytetrafluoroethylene, polychlorotrifluoroethylene, vinylidene polyfluoride, tetrafluoroethylene-hexafluoropropylene copolymer, tetrafluoroethylene-perfluoroalkylvinyl ether copolymers and tetrafluoroethylene-ethylene copolymer; and polyamide resins such as Nylon 6 and Nylon 66.

Among these resins, polyolefin resins are preferable particularly because they have excellent mechanical strength, chemical stability and chemical resistance and high affinity for hydrocarbon-based ion exchange resins. Among the polyolefin resins, a polyethylene or polypropylene resin is particularly preferable, a polyethylene resin is most preferable.

Further, a polyolefin resin porous film is preferable, a polyethylene resin porous film is more preferable because it can be easily available as a porous membrane having the above average pore diameter and has excellent strength.

These porous films can be prepared by the methods disclosed in, for example, Japanese Patent Application Laid-open No. 1997-235399 and 2002-338721. Alternatively, commercially available products (for example, "Hipore" from Asahi Chemical Industry Co., Ltd., "U-pore" from Ube Industries, Ltd., "Setela" from Tonen Tapils Co., Ltd., "Expole" from Nitto Denko Corporation, and "Hilet" from Mitsui Chemicals, Inc.) may also be used.

A water content of an ion exchange resin constituting a membrane for a fuel cell of the present invention is preferably 5% or more, suitably 10% or more. If the water content is less than 5%, proton conductivity is substantially reduced when the ion exchange resin becomes dry. A water content is generally maintained within about 5 to 90%, often about 10 to 80% by controlling the amount of ion-exchange groups and a crosslinking degree within the above ranges.

An ion exchange resin constituting a membrane for a fuel cell of the present invention is crosslinked by covalent bonding. Therefore, its insolubility is retained even when a large number of cation-exchange and anion-exchange groups are introduced to the ion exchange resin. Consequently, a large number of ion-exchange groups can be introduced to significantly reduce an electric resistance value to protons in an ion exchange resin. Specifically, an electric resistance value to protons in an ion exchange membrane may be considerably reduced to 0.70 Ω·cm$^2$ or less, more suitably 0.40 Ω·cm$^2$ or less, further suitably 0.30 Ω·cm$^2$ or less (an electric resistance value in an 3 mol/L aqueous sulfuric acid solution).

Furthermore, as described above, in the ion exchange resin, methanol permeability can be considerably reduced while maintaining a low electric resistance to protons. Specifically, a permeability of methanol through an ion exchange membrane for a 100% methanol solution at 25° C. may be adjusted to 1000 g/m$^2$ hr or less, more suitably 10 to 700 g/m$^2$·hr. further suitably 10 to 300 g/m$^2$ hr.

A membrane for a fuel cell of the present invention has a low electric resistance to protons and low methanol permeability as described above, and therefore, it can be suitably used as a membrane for a direct methanol type fuel cell to adequately prevent methanol supplied to a fuel chamber from penetrating the membrane and then diffusing in an oxidizing-agent chamber, resulting in a fuel cell with a high output. In addition, the membrane for a fuel cell of the present invention exhibits excellent impermeability to a fuel even when being used as a membrane in another solid polymer type fuel cell using a fuel other than methanol, such as hydrogen, ethanol and natural gas.

The above description is mainly for a cation-exchange membrane having more cation-exchange groups than anion-exchange groups. Furthermore, an anion-exchange membrane having more anion-exchange groups than cation-exchange groups has a low electric resistance to hydroxide ions and higher impermeability to a fuel, so that it can be also suitably used as a hydroxide-ion conductive membrane for a fuel cell.

FIG. 1 shows an example of a general configuration of a direct methanol type fuel cell using the above membrane of the present invention as a membrane for a direct methanol type fuel cell. An ion exchange membrane of the present invention can be, of course, applied to a direct methanol type fuel cell having another known structure.

A membrane for a fuel cell of the present invention can be manufactured in any manner, and suitably can be prepared as described below.

First Producing Process

There will be described a first producing process. First, a porous membrane is contacted with a polymerizable composition containing a polymerizable monomer in which cation-exchange-group introducible functional groups or cation-exchange groups are covalently bound, a polymerizable monomer in which anion-exchange-group introducible functional groups or anion-exchange groups are covalently bound, a crosslinking agent and a polymerization initiator to impregnate the voids in the porous membrane with the polymerizable composition.

Next, the monomer and the crosslinking agent filling the voids are polymerized and cured.

Then, cation-exchange groups and/or anion-exchange groups are, if necessary, introduced to the cation-exchange-group or anion-exchange-group introducible functional groups such that ion-exchange groups with either polarity become more than ion-exchange groups with the opposite polarity. The above procedure can provide a membrane for a fuel cell of the present invention.

According to this process, an ion complex is formed in a high yield during preparing a polymerizable composition or introducing ion-exchange groups after producing a membrane. Thus, there can be provided an ion exchange membrane having an ion complex forming rate of at least 40% or more, suitably at least 60% or more which cannot be achieved in a polyion complex type ion exchange membrane used in the conventional membrane for a fuel cell described above.

In the process, a single polymer chain in the ion exchange resin has not only ion-exchange groups with a major polarity but also monomer units having ion-exchange groups with the opposite polarity through copolymerization. It is, therefore, difficult to introduce the former ion-exchange groups in an excessively large amount. When using the producing process, the amount of the former ion-exchange groups is commonly less than 4.8 mmol/g-dry mass, more commonly 4.3 mmol/g-dry mass or less on the basis of the amount of the ion exchange resin filling the voids in the porous membrane.

The polymerizable monomer is preferably a radical polymerizable monomer whose polymerizing group is an ethylenically unsaturated group. When using such a radical polymerizable monomer having an ethylenically unsaturated group, a resulting ion exchange resin generally has a structure that a side chain having a cation-exchange group and/or an anion-exchange group is attached to a hydrocarbon principal chain formed by polymerization of the ethylenic unsaturated group. Such a structure is preferable because each ion-exchange group attached to the side chain can form ion complex dramatically easily in comparison with a structure in which a principal chain has an ion-exchange group.

Among such radical polymerizable monomers whose polymerizing group is an ethylenically unsaturated group, those having a vinyl group are preferable. Specifically, preferred is a polymerizable monomer such as styrene having a vinyl group directly attached to an aromatic ring. These monomers are preferable because they are more susceptible to hydrolysis than an acrylic monomer.

A particularly preferable process involves the steps of contacting a porous membrane with a polymerizable composition containing a polymerizable monomer having a functional group such as an aromatic hydrocarbon group to which a sulfonic acid group can be introduced, a polymerizable monomer having a primary to tertiary nitrogen atom, a crosslinking agent and a polymerization initiator to impregnate the voids in the porous membrane with the polymerizable composition; polymerizing the polymerizable composition; and then sulfonating the aromatic hydrocarbon group in the polymer.

This process can readily provide an ion exchange resin having a sulfonic acid group as a cation-exchange group and a group having a primary to tertiary nitrogen atom (for example, primary to tertiary amino, pyridyl and imidazolyl) as an anion-exchange group.

A polymerizable monomer having a primary to tertiary nitrogen atom is often a liquid. On the other hand, a polymerizable monomer having a sulfonic acid group is generally a solid. When a porous matrix is impregnated with a polymerizable composition, a solid polymerizable monomer having a sulfonic acid group must be dissolved in a solvent to give a solution, which is then supplied to the voids in the porous membrane. However, using a solvent reduces a concentration of the polymerizable composition. Consequently, a density of the ion exchange resin filling the voids in the porous base member may not be increased, or a density of the ion-exchange groups may not be increased.

Even when a polymerizable monomer having a sulfonic acid group is a liquid, mixing the polymerizable monomer having a sulfonic acid group with a polymerizable monomer having an anion-exchange group such as a polymerizable monomer having a primary to tertiary nitrogen atom often leads to formation of an ion complex, which is solidified. In such a case, a solvent is, of course, necessary. An aromatic hydrocarbon group is a functional group which can be considerably readily sulfonated. The process where the above polymerizable composition is polymerized and then the aromatic hydrocarbon group in the polymer is sulfonated is, therefore, particularly preferable.

The polymerizable monomer having an aromatic hydrocarbon group may be any of those known in the art without any particular limitation. A preferable polymerizable monomer having an aromatic hydrocarbon group is a styrene derivative (a styrene type monomer). A styrene type monomer is tolerant to an undesired chemical reaction such as hydrolysis during sulfonation or the use in a fuel cell incorporating it. Specific examples of the styrene type monomer include styrene, vinyltoluene, vinylxylene, α-methylstyrene, vinylnaphthalene and α-halogenated styrenes.

The polymerizable monomer having a primary to tertiary nitrogen atom may be any of known monomers having an anion-exchange group containing the primary to tertiary nitrogen atom as a constituting element without any particular limitation. Styrene derivatives having a primary to tertiary amino group or nitrogen-containing heterocyclic monomers are preferable because they are tolerant to an undesirable chemical reaction such as hydrolysis during sulfonation or the use in a fuel cell incorporating it.

Specific examples of the monomer include amine monomers such as vinylbenzyldimethylamine and vinylbenzyldiethylamine; vinylpyridine type monomers such as 2-vinylpyridine and 4-vinylpyridine; and nitrogen-containing heterocyclic monomers such as vinylimidazole type monomers, for example, 1-vinylimidazole, 2-methyl-1-vinylimidazole, and their salts.

As described above, a cation-exchange group to be introduced is preferably a pyridyl group in the light of providing a fuel cell membrane with particularly excellent proton conductivity. Thus, the polymerizable monomer having a primary to tertiary nitrogen atom is particularly preferably a vinylpyridine type monomer.

On the other hand, a cation-exchange group to be introduced is preferably an imidazolyl group in the light of providing a fuel cell membrane with particularly excellent methanol non-permeability. Thus, the polymerizable monomer having a primary to tertiary nitrogen atom is particularly preferably a vinylimidazole type monomer.

The crosslinking agent may be any of those known in the art which can form a crosslinking type polymer by copolymerization with a polymerizable monomer as described above. Examples include divinyl compounds such as divinylbenzene, divinylsulfone, butadiene, chloroprene, divinylbiphenyl, trivinylbenzene, divinylnaphthalene, diallylamine and divinylpyridine.

There are no particular restrictions to the polymerization initiator as long as it is a compound capable of polymerizing the polymerizable monomer, and an organic peroxide is preferable. Examples of an organic peroxide include octanoyl peroxide, lauroyl peroxide, t-butyl peroxy-2-ethylhexanoate, benzoyl peroxide, t-butyl peroxyisobutyrate, t-butyl peroxylaurate, t-hexyl peroxybenzoate and di-t-butyl peroxide.

The polymerizable composition used in producing process 1 preferably contains a polymerizable monomer having the above aromatic hydrocarbon group, a polymerizable monomer having a primary to tertiary nitrogen atom, a crosslinking agent and a polymerization initiator. However, for adjusting physical properties such as mechanical strength or polymerizability of a polymer, other components may be, if necessary, added to the polymerizable composition. Examples of other components include polymerizable monomers such as acrylonitrile, acrolein and methyl vinyl ketone; and plasticizers such as dibutyl phthalate, dioctyl phthalate, dimethyl isophthalate, dibutyl adipate, triethyl citrate, acetyltributyl citrate and dibutyl sebacate.

In a first preferable producing process, there are no particular restrictions to a blending rate for each component in the polymerizable composition as long as it finally provides a crosslinking type resin and after sulfonation described later, the number of sulfonic acid groups become larger or smaller rate than that of anion-exchange groups such as a primary to tertiary amino group.

In general, an aromatic hydrocarbon group is substantially sulfonated quantitatively. Therefore, the polymerizable composition may contain a polymerizable monomer having an aromatic hydrocarbon group in a larger or smaller rate than a polymerizable monomer having a primary to tertiary nitrogen atom by 0.1 to 3 mmol/g, preferably 0.1 to 2 mmol/g, based on the total amount of all the polymerizable monomers blended.

The crosslinking agent is contained in an amount of preferably 0.1 to 40 moles, more preferably 1 to 10 moles to 100 moles of the total of the polymerizable monomer having an aromatic hydrocarbon group, the polymerizable monomer having a primary to tertiary nitrogen atom and the monofunctional polymerizable monomer added as an optional component, provided that it can be applied to a bifunctional crosslinking agent and a trifunctional crosslinking agent is used as described for the bifunctional agent.

A blending rate of the polymerization initiator is preferably 0.1 to 20 parts by mass, more preferably 0.2 to 10 parts by mass to 100 parts by mass of the total of the polymerizable monomers. Furthermore, it is preferable to add, to 100 parts by mass of a polymerizable monomer having a functional group to which an ion-exchange group can be introduced or a polymerizable monomer having an ion-exchange group, 0 to 100 parts by mass (or 0 to 50 parts by mass when adding a plasticizer) of another monomer which can be copolymerizable with these monomers.

In the first producing process, the polymerizable composition is contacted with the porous membrane to impregnate the voids in the porous membrane with the polymerizable composition and then the polymerizable composition is polymerized and cured.

There are no particular restrictions to the way of contacting the polymerizable composition with the porous membrane as long as the voids in the porous membrane are impregnated with the polymerizable composition. Examples includes applying or spraying the polymerizable composition to the porous membrane, and immersing the porous membrane into a polymerizable composition or a solution or suspension thereof. In the method involving immersion, an immersion time is generally 0.1 seconds to ten and several minutes, depending on the type of the porous membrane and a composition of the suspension.

A polymerization method may be appropriately selected from known methods without any particular restriction, depending on a polymerizable monomer and a polymerization initiator used. When using the above organic peroxide as a polymerization initiator, polymerization is generally conducted by heating (thermal polymerization). The method is more preferable than any other polymerization method because it can be conducted without difficulty and can result in relatively homogeneous polymerization.

It is preferable during the polymerization to cover the porous membrane whose voids are filled with the polymerizable composition, by a film such as a polyester film for maintaining the state that the membrane is pressed inwardly from the outside of the film. By initiating polymerization under the conditions, inhibition of polymerization by oxygen can be prevented and the surface of a membrane produced can be smooth. Furthermore, by covering the surface of the porous membrane with a film and applying a pressure, the polymerizable composition excessively absorbed in the porous membrane can be removed to give a thin and homogeneous polymer membrane.

There are no particular restrictions to a polymerization temperature and any known condition for a polymerization temperature may be selected as appropriate. In general, it is preferably 50 to 150° C., more preferably 60 to 120° C.

A polymerization time is preferably 10 min to 10 hours, more preferably 30 min to 6 hours.

The resulting polymer membrane is a polymer membrane in which a crosslinking type anion exchange resin having an anion-exchange group containing a primary to tertiary nitrogen atom is dispersed in a porous membrane. The anion-exchange group is derived from the polymerizable monomer having a primary to tertiary nitrogen atom used as a starting material. The polymer membrane further has an aromatic hydrocarbon group. As described above, the number of the aromatic hydrocarbon is larger or smaller than that of the anion-exchange group.

When the aromatic hydrocarbon group is sulfonated as usual, the aromatic hydrocarbon group is substantially quantitatively sulfonated to form an ion complex in a high yield. Resultantly, there is provided a crosslinking type ion exchange resin membrane having more or less cation-exchange groups (sulfonic acid group) than anion-exchange groups.

The sulfonation can be conducted using a known sulfonation agent. Examples of a sulfonating agent include concentrated sulfuric acid, fuming sulfuric acid, sulfur dioxide and chlorosulfonic acid, which can be used without any particular restriction.

Of course, a process for preparing a membrane for a fuel cell of the present invention is not limited to the above method, and a polymerizable monomer or a method for introducing an ion-exchange group can be appropriately selected and employed, depending on the types of the cation-exchange group/the anion-exchange group.

In terms of a polymerizable monomer which can be used in a method other than that described above, examples of a monomer having a cation-exchange group include acidic-group containing polymerizable monomers including sulfonic acid monomers such as α-halovinylsulfonic acid, styrenesulfonic acid, vinylsulfonic acid and 2-(meth)acrylamido-2-methylpropanesulfonic acid; carboxylic acid monomers such as methacrylic acid, acrylic acid, maleic anhydride and 3-sulfopropyl(meth)acrylic acid; phosphonic acid monomers such as vinylphosphoric acid and vinylphosphonic acid; and their salts.

Examples of a polymerizable monomer to which a cation-exchange group can be introduced include esters of an acidic-group containing polymerizable monomer.

Examples of a polymerizable monomer having an anion-exchange group other than a group having a primary to tertiary nitrogen atom include vinylbenzyltrimethylamine salts, vinylbenzyltriethylamine salts and trimethylaminoethyl(meth)acrylate salts.

Examples of a polymerizable monomer to which an anion-exchange group can be introduced include styrene, vinyltoluene, chloromethylstyrene, α-methylstyrene and vinylnaphthalene. The ion-exchange group can be introduced by a known method such as hydrolysis, phosphonylation, esterification and amination.

When an ion-exchange group is introduced to a polymer membrane by a method other than the above producing process of the present invention after forming the polymer membrane, it is preferable that a cation-exchange group is introduced, then an anion-exchange group is introduced. This is because the reaction for introducing the cation-exchange group is conducted under a relatively stronger oxidation atmosphere, so that an anion-exchange group which has been already introduced is susceptible to oxidative decomposition.

A crosslinking type ion exchange resin constituting a membrane for a fuel cell prepared by the above process has a structure that both cation-exchange and anion-exchange groups are covalently bound to a polymer chain at random and the polymer chain is crosslinked via covalent bonds.

The membrane for a fuel cell thus prepared is, after washing and/or cutting when necessary, used as a membrane for a direct methanol type fuel cell in a usual manner.

Second Producing Process

In the second producing process for a membrane for a fuel cell of the present invention, first a base ion-exchange membrane in which voids in a porous membrane are filled with a crosslinking type ion exchange resin is contacted with a polymerizable monomer having an ion-exchange group having the opposite polarity to the ion-exchange group in the above ion exchange resin. By the step, the ion exchange resin is impregnated with the polymerizable monomer and an ion complex is formed between the ion-exchange group in the crosslinking type ion exchange resin and the ion-exchange group in the polymerizable monomer. A rate of forming this ion complex becomes very high because the formation is conducted utilizing the above polymerizable monomer having higher movement freedom due to its low molecular weight. Thus, otherwise as described in the first producing process, a membrane can be prepared in a further higher rate of ion complex formation than the ion exchange membrane prepared by the first producing process.

Since the base ion-exchange membrane is formed before forming the ion complex in this producing process, a large number of the ion-exchange groups can be introduced to the ion exchange resin constituting the base ion-exchange membrane. Thus, in this process, a membrane can be produced, which has a larger number of the ion-exchange groups than that by the first producing process where a membrane is formed by the above copolymerization. Specifically, the amount of the ion-exchange groups with a major polarity may be 4.8 mmol/g-dry mass or more, more commonly 5.2 mmol/g-dry mass or more based on the ion exchange resin filling the voids in the porous membrane.

In the base ion-exchange membrane described above, the crosslinking structure in the crosslinking type ion exchange resin filling the voids in the porous membrane is as defined for that in the above membrane for a fuel cell of the present invention, and is intended to be a crosslinking structure based on a covalent bond such as a carbon-carbon bond and a carbon-oxygen bond. A crosslinking type resin is used as an ion exchange resin in a base ion-exchange membrane, accordingly the membrane for a fuel cell prepared by the second producing process prevent swelling with water or methanol, resulting in sufficiently lowered methanol permeability. It can be made essentially insoluble in a solvent, so that a large amount of ion-exchange groups can be introduced without any inconvenience of deterioration in resin stability such as increase of its solubility in water or methanol. Therefore, an extremely large amount of ion-exchange groups can be introduced to the base ion-exchange membrane and thus, a membrane resistance to proton permeation can be considerably reduced.

Furthermore, when an ion exchange resin is contacted with a polymerizable monomer having an ion-exchange group, significant swelling with or dissolution in the polymerizable monomer which is generally used as a solution can be avoided, and stably produce a membrane for a fuel cell. In addition, swelling with the polymerizable monomer can be prevented that permeation of an excessive amount of the polymerizable monomer having an ion-exchange group with the opposite polarity into the crosslinking type ion exchange resin is inhibited, resulting in a membrane for a fuel cell having a low membrane resistance.

In the producing process of the present invention, the crosslinking type ion exchange resin used in the above base ion-exchange membrane may be selected from known crosslinking type ion exchange resins without any limitation.

The ion-exchange group in the ion exchange resin may be either a cation-exchange group or anion-exchange group, but is preferably a cation-exchange group for ensuring good proton conductivity in a membrane for a fuel cell prepared. Specific examples of the cation-exchange group and anion-exchange group are as described above for the membrane for a fuel cell of the present invention.

An ion-exchange capacity of the crosslinking type ion exchange resin used in this base ion-exchange membrane is preferably 0.1 to 6 mmol/g. An ion exchange resin having an ion-exchange capacity within this range can be used to reduce an electric resistance to protons in the membrane for a fuel cell prepared.

A crosslinking density (from crosslinking by a covalent bond) in the crosslinking type ion exchange resin, a method for preparing a crosslinking type resin and a matrix structure may be also as described above for the membrane for a fuel cell of the present invention.

Specifically, an electric resistance value to protons in a crosslinking type ion exchange resin used in these base ion-exchange membranes is preferably 0.40 $\Omega \cdot cm^2$ or less, more preferably 0.30 Ω·cm² or less. An electric resistance value is expressed as an electric resistance in an 3 mol/L aqueous sulfuric acid solution.

A water content of an ion exchange resin is preferably 5% or more, more preferably 10% or more. An ion exchange resin having a water content within the range can be used to reduce an electric resistance to protons in the membrane for a fuel cell prepared and furthermore to prevent reduction in proton conductivity due to drying of the membrane for a fuel cell prepared.

The porous membrane as the base member may be as described for the first producing process.

The base ion-exchange membrane comprising the above porous membrane as a base member can be prepared by any method. Generally, it is preferably prepared as follows. First, a porous membrane is contacted with a polymerizable composition containing a polymerizable monomer having a functional group to which an ion-exchange group can be introduced or an ion-exchange group bonded via a covalent bond, a crosslinking agent and a polymerization initiator to impregnate the voids in the porous membrane with the polymerizable composition. Then, the impregnating polymerizable composition is polymerized and cured. Next, an ion-exchange group is, if necessary, introduced to the polymerized/cured polymerizable composition.

The polymerizable monomer, and the crosslinking agent and the polymerization initiator may be the compounds used in the first producing process, respectively. The amount of each component is as described for the first producing process.

The polymerizable composition may contain, if necessary, other components for adjusting physical properties such as mechanical strength and polymerizability. Specific examples of the other components and their amounts are as described for the first producing example.

As described above, in the second producing process, a porous membrane is contacted with the polymerizable composition to impregnate the voids in the porous membrane with the polymerizable composition before polymerizing and curing the polymerizable composition. The method may be also as described for the contact between the polymerizable composition and the porous membrane in the first producing example.

The polymer membrane thus prepared is, if necessary, further treated by a known procedure for introducing an ion-exchange group to give a base ion-exchange membrane. The procedure for introducing an ion-exchange group is also as described for the first producing example.

The base ion-exchange membrane prepared by the above process is an ion exchange membrane where a crosslinking type ion exchange resin having a cation-exchange group such as a sulfonic acid group or an anion-exchange group such as a group containing a primary to tertiary nitrogen atom via a covalent bond is dispersed in the porous membrane.

In the second producing process of the present invention, a base ion-exchange membrane comprising a crosslinking type ion exchange resin prepared typically by the above process is contacted with a polymerizable monomer having, via a covalent bond, an ion-exchange group with the opposite polarity to the ion-exchange group in the base ion-exchange membrane. That is, when the ion-exchange group in the base ion-exchange membrane is a cation-exchange group, the polymerizable monomer to be contacted is a polymerizable monomer having an anion-exchange group. When the ion-exchange group in the base ion-exchange membrane is an anion-exchange group, the polymerizable monomer to be contacted is a polymerizable monomer having a cation-exchange group.

There are no particular restrictions to the polymerizable monomer as long as it has the above ion-exchange group via a covalent bond, but it has a molecular weight of 280 or less, preferably 200 or less in the light of forming an ion complex in a high yield with the ion-exchange group in the crosslinking type ion exchange resin because an excessively higher molecular weight may lead to reduced freedom of its movement within the base ion-exchange membrane and then to deterioration in reactivity described above. Examples of such a polymerizable monomer include polymerizable monomers having an ion-exchange group used in the preparation of the crosslinking type ion exchange resin described above.

A membrane for a fuel cell of the present invention comprises both anion-exchange and cation-exchange groups, where either of these exchange groups are contained in a larger number than the other. That is, either of anion-exchange and cation-exchange groups may be a major group.

As described above, proton conductivity in the membrane for a fuel cell prepared is, however, higher in an ion exchange membrane having more cation-exchange groups than anion-exchange groups than in an ion exchange membrane having more anion-exchange groups than cation-exchange groups.

When preparing a membrane for a fuel cell having more cation-exchange groups than anion-exchange groups, the polymerizable monomer having an ion-exchange group to be contacted with the base ion-exchange membrane is a polymerizable monomer having an anion-exchange group.

The polymerizable monomer having an anion-exchange group is the polymerizable monomer having an anion-exchange group containing a primary to tertiary nitrogen atom used in the first producing process and is used as described in the first producing process.

Any method can be used in contacting the polymerizable monomer having an ion-exchange group with the crosslinking type ion exchange resin filling the base ion-exchange membrane as long as the polymerizable monomer can be absorbed into the ion exchange resin. In the light of easiness in contacting and in permeating the ion exchange resin, the polymerizable monomer as a liquid is preferably contacted with the base ion-exchange membrane.

When the polymerizable monomer having an ion-exchange group is a liquid, the monomer as it is may be contacted with the base ion-exchange membrane. However, if the polymerizable monomer excessively permeates the base ion-exchange membrane, a membrane resistance to proton movement in the membrane prepared may be excessively increased. Herein, the polymerizable monomer is preferably dissolved in a solvent before being contacted with the base ion-exchange membrane.

A diluent solvent may be selected from those capable of completely dissolving the polymerizable monomer having an ion-exchange group without any limitation. Specific examples include alcohols such as methanol, ethanol, 1-butanol and 2-ethoxyethanol; aliphatic hydrocarbons such as hexane, cyclohexane, heptane and 1-octane; amines such as dimethyloctylamine and pyridine; aromatic hydrocarbons such as toluene, xylenes and naphthalene; ketones such as acetone, cyclohexanone and methyl ethyl ketone; ethers such as dibenzyl ether and diethyleneglycol dimethyl ether; halogenated hydrocarbons such as methylene chloride, chloroform and ethylene bromide; alcohol esters of an aromatic or aliphatic acid such as dimethyl phthalate, dioctyl phthalate, dimethyl isophthalate, dibutyl adipate, triethyl citrate, acetyltributyl citrate and dibutyl sebacate; and esters of an alkylphosphoric acid. These diluent solvents may be, if necessary, used in combination of two or more.

Although the polymerizable monomer having an ion-exchange group alone or as a solution in any of the various solvents can be contacted with the base ion-exchange membrane, it is preferable to contact a mixture containing the crosslinking agent and the polymerization initiator with the base ion-exchange membrane. Contacting as the mixture may result in improved reactivity during polymerization and furthermore longer methanol non-permeability of the membrane for a fuel cell prepared.

The crosslinking agent and the polymerization initiator may be the crosslinking agent and the polymerization initiator used in the preparation of the above crosslinking type ion exchange resin with any particular limitation.

Furthermore, another polymerizable monomer without any ion-exchange group may be added to, if necessary, a polymerizable monomer having an ion-exchange group or its solution for, for example, adjusting a polymerization rate and/or mechanical strength of the membrane for a fuel cell obtained.

There are no particular restrictions to the amounts of the components other than the polymerizable monomer having an ion-exchange group, but the solvent is generally used in 0 to 200 parts by mass, preferably 0 to 100 parts by mass to one part by mass of the polymerizable monomer having an ion-exchange group. The amount of the crosslinking agent is generally 0 to 15 moles, preferably 0 to 10 moles to 100 moles of the total of a monofunctional polymerizable monomer having an ion-exchange group and as an optional component a monofunctional polymerizable monomer without any ion-exchange group. The amount of the polymerization initiator is generally 0 to 20 parts by mass, preferably 0 to 10 parts by mass to the 100 parts by mass of the total of the polymerizable monomers.

There are no particular restrictions to a method for contacting the base ion-exchange membrane filled with the crosslinking type ion exchange resin with a mixture of the polymerizable monomer having an ion-exchange group and an optional component added as appropriate.

Specific examples includes applying or spraying the mixture to the base ion-exchange membrane, and immersing the base ion-exchange membrane into the mixture. When using the method involving immersion, an immersion time is generally 0.1 seconds to one hour, depending on the type of the base ion-exchange membrane and a concentration of the polymerizable monomer having an ion-exchange group in the mixture.

Since the ion exchange resin contains hydrophilic groups, it is generally wet, containing water. After the wet base ion-exchange membrane is dried at ambient temperature and pressure about for 24 hours, it can be contacted with the polymerizable monomer or its solution to allow the polymerizable monomer having an ion-exchange group to easily permeate the base ion-exchange membrane. It is, therefore, desirable to dry the base ion-exchange membrane before contacting.

In the second producing process for a membrane for a fuel cell, the polymerizable monomer having an ion-exchange group filling the base ion-exchange membrane is then polymerized.

The polymerization method may be appropriately selected from known methods, depending on a polymerizable monomer (and a polymerization initiator) used. When using the above organic peroxide as a polymerization initiator, polymerization is generally conducted by heating (thermal polymerization). The method is more preferable than any of the other methods because relatively homogeneous polymerization can be achieved by an easy procedure.

In the polymerization, it is more preferable to cover the base ion-exchange membrane by a film such as a polyester film for preventing oxygen from interfering with the polymerization and making the surface smooth before initiating polymerization while pressing the film from the outside toward the base ion-exchange membrane.

Furthermore, by covering the surface of the porous membrane with a film and applying a pressure, the polymerizable composition excessively absorbed in the porous membrane can be removed to give a thin and homogeneous polymer membrane.

There are no particular restrictions to a polymerization temperature and any known condition for a polymerization temperature may be selected as appropriate. In general, it is preferably 50 to 150° C., more preferably 60 to 120° C.

A polymerization time is preferably 10 min to 10 hours, more preferably 30 min to 6 hours.

The above process provides a membrane for a fuel cell in which the voids in the porous membrane are filled with the ion exchange resin.

The ion exchange resin filling the voids in the porous membrane is an ion exchange resin as a mixture of a crosslinking type ion exchange resin in which a cation-exchange or anion-exchange group is covalently bound to a polymer chain and an ion exchange resin in which an ion-exchange group having the opposite polarity to the ion-exchange group in the crosslinking type ion exchange resin is covalently bound to a polymer chain.

The membrane for a fuel cell prepared by the above producing process of the present invention can be incorporated as it is into a fuel cell for use. However, the membrane would contain the unreacted polymerizable monomer or the residual polymerization initiator, which may cause deterioration in a fuel cell catalyst. It is, therefore, preferable to wash the membrane with a solvent such as methanol and ethanol capable of dissolving these monomers before being used as a membrane for a fuel cell.

Particularly, in the second producing process, it is difficult to substantially completely polymerize the polymerizable monomer having an ion-exchange group with the opposite polarity which have permeated the crosslinking type ion exchange resin in the base ion-exchange membrane, and thus low molecular-weight compounds such as the unreacted polymerizable monomer and a polymer with a lower polymerization degree tend to remain. Such a low-molecular weight polymer having the ion-exchange group with the opposite polarity prominently causes deterioration in the activity of the fuel cell catalyst. Therefore, in the membrane for a fuel cell prepared by the above second producing process, such washing of the membrane is considerably effective and it is suitable to reduce the content of low molecular-weight compounds having the ion-exchange group with the opposite polarity to 0.05 mmol/g-dry mass or less, more preferably 0.03 mmol/g-dry mass or less as expressed as the amount of the ion-exchange group.

Since a low molecular-weight compound having the ion-exchange group with the opposite polarity often forms an ion complex with the ion-exchange group in the base ion-exchange membrane, it is effective to wash the membrane with a basic or acidic solution as a washing solution for improving a washing efficiency.

When the ion-exchange group of the monomer in the low molecular-weight compound is an anion-exchange group, the washing procedure may be washing with a basic solution.

Examples of such a basic solution include a 0.05 to 3 mol/l solution of metal hydroxide such as sodium hydroxide and potassium hydroxide in water, methanol, ethanol or a mixture thereof.

When the ion-exchange group in the low molecular-weight compound is a cation-exchange group, washing may be conducted with an acidic solution. Preferable examples of an acidic solution include a 0.05 to 3 mol/l hydrochloric acid, sulfuric acid or nitric acid in water, methanol, ethanol or a mixture thereof.

A washing is preferably used in about 100 to 5000 parts by mass to one part by mass of the fuel cell membrane. A temperature of the washing is generally 20 to 100° C. during washing.

In the first and the second producing processes described above, an electric resistance value of the fuel cell membrane prepared to protons is generally 0.50 $\Omega \cdot cm^2$ or less, particularly 0.35 $\Omega \cdot cm^2$ or less (an electric resistance value in a 3 mol/L aqueous sulfuric acid solution) for the former process. For the latter process, it is generally 0.70 $\Omega \cdot cm^2$ or less, particularly 0.40 $\Omega \cdot cm^2$ or less. In the former process, permeability to a 100% methanol solution at 25° C. is generally 1000 $g/m^2$ hr or less, particularly 10 to 700 $g/m^2 \cdot hr$ or less. For the latter process, it is generally 500 $g/m^2$ hr or less, particularly 10 to 300 $g/m^2 \cdot hr$ or less.

The membrane for a fuel cell of the present invention prepared by the above processes has either of the anion-exchange or the cation-exchange group in a larger number than the other. When the cation-exchange group is contained in a larger number than the anion-exchange group, it is particularly preferable as a membrane for a proton-conductive type fuel cell. When it has the anion-exchange group and the cation-exchange group in an equal number or the anion-exchange group in a larger number, it might be difficult to obtain a sufficient electronic power of fuel cell, because movement of hydrogen ions would be limited. However, even such a membrane is useful as an hydroxy-ion conductive membrane for a fuel cell when the membrane has the anion-exchange group in a larger number, as described above.

A cation exchange capacity in the cation-exchange membrane having the cation-exchange group in a larger number than the anion-exchange group is 0.1 to 3 mmol/g, particularly preferably 0.1 to 2 mmol/g as determined in a usual manner. An absolute amount of the anion-exchange group in the membrane is preferably 0.1 to 3 mmol/g, more preferably 0.2 to 2 mmol/g. Such an ion-exchange group density can be controlled, for example, by adjusting a monomer concentration when impregnating an ion exchange resin with a polymerizable monomer having an ion-exchange group with the opposite polarity in the second producing process; by conducting impregnation using a non-polymerizable and ion-exchangeable compound such as pyridine as a solvent and then removing pyridine and so on with a solvent; or adjusting a contact time.

EXAMPLES

The present invention will be more specifically described with reference to, but not limited to, Examples.

First, there will be described the methods for determining a cation-exchange capacity, a water content, a cation-exchange group amount, an anion-exchange group amount, a cation-exchange group amount based on an ion exchange resin, an ion-complex amount, a membrane resistance, a methanol permeability and a fuel cell output voltage for the membranes for a fuel cell prepared in Examples and Comparative Examples.

1) Cation-Exchange Capacity and Water Content

A membrane for a fuel cell was immersed in a 1 mol/L aqueous HCl solution for 10 hours or more, to make it a hydrogen-ion type. The hydrogen-ion type membrane was immersed in a 1 mol/L aqueous NaCl solution to convert it into a sodium-ion type. Hydrogen ions liberated by the conversion were quantified using an aqueous sodium hydroxide solution (A mol). The quantification was conducted using a potentiometric titrator (COMTITE-900, HIRANUMA SANGYO Co., Ltd.).

Next, the membrane was immersed in a 1 mol/L aqueous HCl solution for 4 hours or more, and then thoroughly washed with ion-exchange water. After wiping out water on the membrane surface with a tissue, a wet mass (W g) was measured. Then, the membrane was dried in vacuo at 60° C. for 5 hours and its mass was measured (D g). From the above measured values, an ion-exchange capacity and a water content were determined in accordance with the following equations.

Ion-exchange capacity=$A \times 1000/D$[mmol/g-dry mass]

Water content=$100 \times (W-D)/D$[%]

2) Cation-Exchange Group Amount and Anion-Exchange Group Amount

A membrane for a fuel cell was immersed in a 1 mol/L aqueous HCl solution for 10 hours or more, to make it a hydrogen-ion type. Then, the membrane was thoroughly washed with ion-exchange water and dried in vacuo at 60° C. for 5 hours. It was analyzed by infrared spectroscopy to confirm that a sulfonic acid (or its salt) group and a pyridyl (or pyridinium) or amino (or ammonium) group were introduced. The membrane was subjected to elementary analysis and the amounts of the cation-exchange group and the anion-exchange group were calculated from the contents of sulfur (S) and nitrogen (N), respectively.

3) Cation-Exchange Group Amount Based on an Ion Exchange Resin

A 20 cm×20 cm porous membrane was dried in vacuo at 60° C. for 5 hours and its mass was measured. Then, the porous membrane was used to prepare a membrane for a fuel cell of the present invention according to the description in Examples. The prepared membrane for a fuel cell was immersed in a 1 mol/L aqueous HCl solution for 10 hours or more to make it a hydrogen-ion type. Next, the membrane was thoroughly washed with ion-exchange water and dried in vacuo at 60° C. for 5 hours, and the mass of the membrane for a fuel cell was measured. A content of the ion exchange resin in the membrane for a fuel cell was determined from a difference between the mass of the porous membrane used and the mass of the membrane for a fuel cell. A cation-exchange group amount based on the ion exchange resin was calculated from the above cation-exchange group amount and the content of the ion exchange resin.

4) Ion-Complex Amount

A rate of the amount of an ion complex to the amount of minor ion-exchange group was calculated from a cation-exchange capacity, a cation-exchange group amount and an anion-exchange group amount using the following equation.

$X=(C2-C2)/A2$

X: an ion-complex amount [%];

C1: a cation-exchange capacity [mmol/g-dry mass];

C2: a cation-exchange group amount [mmol/g-dry mass]; and

A2: an anion-exchange group amount [mmol/g-dry mass].

5) Membrane Resistance

A membrane for a fuel cell was disposed in the center of a two-chamber cell, each cell of which has a platinized electrode, and then both sides of the membrane were filled with a 3 mol/L aqueous sulfuric acid solution. A resistance between the platinized electrodes at 25° C. was measured using an AC bridge (frequency: 1,000 cycles/sec) circuit. A membrane resistance was determined from a difference between a resistance between the electrodes and a resistance between them without a membrane. The membrane used in this measurement had been equilibrated by immersing it in a 3 mol/L aqueous sulfuric acid solution.

6) Methanol Permeability

In a 50 mL glass container with a 0.8 cm$^2$ opening as shown in FIG. 3 was placed 40 mL of methanol. A membrane was mounted on the opening as shown in FIG. 3, and then the mass of the container was measured. Next, the glass container was turned upside down such that the membrane became the bottom; immediately placed in a thermo-hygrostat maintained at a relative humidity of 40% at 25° C. and left for 24 hours or more. A mass of the container after standing was measured. From these measured values, a methanol permeability was calculated using the following equation. The membrane used in the above measurement had been equilibrated by immersing it in a 1 mol/L aqueous hydrochloric acid solution.

$$Q=(G1-G2)/(a \times t)$$

Q: a methanol permeability [g/(m$^2$ hr)];
G1: a mass before measurement [g];
G2: a mass after measurement [g];
a: a methanol permeation area=0.8/10,000 [m$^2$]; and
t: a measuring time [hr].

7) Fuel Cell Output Voltage

A carbon paper with a thickness of 100 μm and a porosity of 80% which had been made water-repellent treatment with polytetrafluoroethylene was prepared.

Carbon black carrying 50 mass % of a catalyst as an alloy of platinum and ruthenium (50 mol % of ruthenium) was mixed with a 5% solution of a perfluorocarbonsulfonic acid solved in alcohol-water (DuPont, Nafion™). This mixture was applied to the carbon paper such that the amount of the catalyst was 2 mg/cm$^2$. The paper was dried in vacuo at 80° C. for 4 hours to give a gas diffusion electrode.

Next, the above gas diffusion electrodes were mounted on both sides of a membrane for a fuel cell which had been equilibrated by immersing it in a 1 mol/L aqueous hydrochloric acid solution; pressed at 100° C. under a pressure of 5 MPa for 100 sec; and then left at room temperature for 2 min. The membrane having the gas diffusion electrodes was used to prepare a fuel cell having the structure shown in FIG. 1. Setting a temperature of the fuel cell thus prepared to 25° C., power generation was initiated by feeding a 20 mass % aqueous methanol solution and oxygen in a rate of 200 mL/min at an atmosphere pressure to a fuel chamber and an oxidizing-agent chamber, respectively. The membrane was evaluated by measuring a cell terminal voltage at a current density of 0 A/cm$^2$ and 0.1 A/cm$^2$.

8) A Content of a Low Molecular-Weight Compound Having an Ion-Exchange Group with the Opposite Polarity in an Ion Exchange Resin A membrane for a fuel cell was immersed in a 0.5 mol/l solution of sodium hydroxide in a mixture of water and methanol (water: 50 mass %) at room temperature for 10 hours. Then, the membrane for a fuel cell was removed and washed with ion-exchange water, and an anion-exchange group amount was measured by elementary analysis for nitrogen. The procedure was repeated several times until no reduction in an anion-exchange group amount was observed. A content of a low molecular-weight compound having an ion-exchange group with the opposite polarity was determined using a difference between the final anion-exchange group amount and the anion-exchange group amount before the immersion in a sodium hydroxide solution.

First Producing Process

Examples 1 to 5

The monomer compositions shown in Table 1 were prepared. In a 500 ml glass container was placed 400 g of each of these monomer compositions, and a porous membrane shown in Table 1 (A or B, each 20 cm×20 cm) was immersed in each monomer composition.

Next, the porous membrane A or B was removed from the monomer composition; both sides of the porous membrane were covered by a polyester film (releasing material) with a thickness of 100 μm; and under an nitrogen atmosphere in an autoclave, it was then polymerized by heating at 80° C. under a pressure of 0.29 MPa (3 kg/cm$^2$) for 5 hours.

The film product obtained was sulfonated by immersing it in a 1:1 mixture of 98% concentrated sulfuric acid and 90% or more pure chlorosulfonic acid at 40° C. for 60 min to give a membrane for a fuel cell.

For these membranes for a fuel cell were determined a cation-exchange group amount, a cation-exchange group amount based on an ion exchange resin, an anion-exchange group amount, a cation-exchange capacity, an ion-complex amount, a water content, a membrane resistance, a membrane thickness, a methanol permeability and a fuel cell output voltage. The results are shown in Table 2.

Example 6

An ion exchange membrane having a sulfonic acid group and a pyridyl group was prepared as described in Example 1, using the monomer composition and the porous membrane for Example 6 in Table 1. Then, the ion exchange membrane was immersed in a 1:3 (by mass) mixture of methyl iodide and n-hexane at 30° C. for 24 hours for converting the pyridyl group into a quaternary pyridinium group to give a membrane for a fuel cell.

The properties of the membrane for a fuel cell were evaluated. The results are shown in Table 2.

Comparative Example 1

A membrane for a fuel cell was prepared as described in Example 1, except that the monomer composition and the porous membrane shown in Table 1 were used.

The properties of the membrane for a fuel cell were evaluated. The results are shown in Table 2.

Comparative Examples 2 and 3

A polyether ether ketone (Victrex plc) was sulfonated in 98% sulfuric acid for 72 hours. The resulting solution containing the sulfonated polyether ether ketone was poured into ion-exchange water to precipitate the sulfonated polyether ether ketone, which was subsequently washed twice with ion-exchange water and then dried in vacuo at 50° C. for 10 hours. The resulting sulfonated polyether ether ketone had a cation-exchange capacity of 2.1 mmol/g.

To a 10 mass % solution of the sulfonated polyether ether ketone in dimethylformamide was added a 10 mass % solution of poly-4-vinylpyridine (Aldrich, molecular weight: 70,000) in dimethylformamide in a rate shown in Table 3, which induced precipitation. A 25% aqueous ammonia solution was added to dissolve the precipitate to prepare a cast solution.

Then, the cast solution was casted on a glass plate, dried at room temperature for 24 hours and dried at 60° C. for 5 hours. The resulting cast film was immersed in a 0.5 mol/L aqueous sulfuric acid solution for 12 hours to remove excessive ammonia. Thus, a membrane for a fuel cell containing a polyion complex was prepared.

The properties of the membrane for a fuel cell were evaluated. The results are shown in Table 4.

Examples 7 and 8

An ion exchange membrane having a sulfonic acid group and a chloromethyl group as a precursor for an anion-exchange group was prepared as described in Example 1, except that the monomer composition and the porous membrane shown in Table 5 were used.

Then, the ion exchange membrane was immersed in a 10 mass % solution of trimethylamine in a mixture of acetone and water (acetone:water=1:1) for 24 hours for derivatizing the chloromethyl group to a quaternary ammonium group to prepare a membrane for a fuel cell of the present invention.

The properties of the membrane for a fuel cell were evaluated. The results are shown in Table 6.

Examples 9 to 11

The monomer compositions shown in Table 7 were prepared. In a 500 ml glass container was placed 400 g of each monomer composition, and porous membrane A shown in Table 1 (each 20 cm×20 cm) was immersed in each monomer composition.

Next, the porous membrane was removed from the monomer composition; both sides of the porous membrane were covered by a polyester film (releasing material) with a thickness of 100 m; and under an nitrogen atmosphere in an autoclave, it was then polymerized by heating at 43° C. under a pressure of 3 kg/cm$^2$ for 3 hours and then at 75° C. for 2 hours.

The film product obtained was sulfonated by immersing it in a 1:1 mixture of 98% concentrated sulfuric acid and 90% or more pure chlorosulfonic acid at 40° C. for 60 min to give a membrane for a fuel cell.

The properties of these membranes for a fuel cell were evaluated. The results are shown in Table 8.

Example 12

A membrane for a fuel cell was prepared as described in Example 10, except that thermal polymerization was conducted under the conditions of 90° C. and 5 hours.

The properties of the membrane for a fuel cell were evaluated. The results are shown in Table 8.

TABLE 1

|  | Porous membrane | Composition (parts by mass) | | | | DVB (based on a monofunctional monomer; mol %) |
| --- | --- | --- | --- | --- | --- | --- |
|  |  | St | 4VP | DVB | PO |  |
| Example 1 | A | 55 | 45 | 5 | 5 | 4.0 |
| 2 | A | 55 | 45 | 10 | 5 | 8.0 |
| 3 | A | 55 | 45 | 15 | 5 | 12.1 |
| 4 | A | 77 | 23 | 5 | 5 | 4.0 |
| 5 | B | 55 | 45 | 5 | 5 | 4.0 |
| 6 | A | 55 | 45 | 5 | 5 | 4.0 |
| Comparative Example 1 | A | 100 | 0 | 10 | 5 | 8.0 |

Porous membranes A: polyethylene with a weight average molecular weight of 250,000; film thickness: 25 μm; average pore diameter: 0.03 μm; porosity: 37%; B: polyethylene with a weight average molecular weight of 200,000; film thickness: 16 μm; average pore diameter: 0.03 μm; porosity: 41%;
St: styrene;
4VP: 4-vinylpyridine;
DVB: divinylbenzene;
PO: t-butylperoxyethyl hexanoate.

TABLE 2

|  |  | Cation-exchange group amount mmol/g-dry membrane | Cation-exchange group amount based on an ion exchange resin mmol/g-dry mass | Anion-exchange group amount mmol/g-dry membrane | Cation-exchange capacity mmol/g-dry membrane | Ion-complex amount % | Water content % | Membrane resistance Ω·cm$^2$ | Membrane thickness μm | Methanol permeability g/m$^2$·hr | Fuel cell output voltage V | |
| --- | --- | --- | --- | --- | --- | --- | --- | --- | --- | --- | --- | --- |
|  |  |  |  |  |  |  |  |  |  |  | 0 A/cm$^2$ | 0.1 A/cm$^2$ |
| Example | 1 | 1.6 | 3.8 | 1.2 | 0.45 | 95 | 29 | 0.13 | 30 | 350 | 0.82 | 0.37 |
|  | 2 | 1.6 | 3.8 | 1.2 | 0.63 | 80 | 25 | 0.16 | 29 | 390 | 0.81 | 0.35 |
|  | 3 | 1.5 | 3.6 | 1.1 | 0.91 | 54 | 23 | 0.32 | 28 | 430 | 0.80 | 0.31 |
|  | 4 | 1.9 | 4.2 | 0.6 | 1.4 | 83 | 33 | 0.09 | 31 | 650 | 0.73 | 0.31 |
|  | 5 | 1.6 | 3.8 | 1.2 | 0.52 | 90 | 30 | 0.10 | 17 | 410 | 0.81 | 0.37 |
|  | 6 | 1.6 | 3.8 | 1.2 | 0.56 | 86 | 27 | 0.14 | 30 | 410 | 0.81 | 0.36 |
| Comparative Example 1 |  | 2.4 | 5.7 | 0 | 2.4 | — | 29 | 0.08 | 31 | 1080 | 0.60 | 0.25 |

TABLE 3

| Comparative Example | Composition (parts by mass) | |
|---|---|---|
| | S-PEEK | P-4VP |
| 2 | 93 | 7 |
| 3 | 87 | 13 |

S-PEEK: sulfonated polyether ether ketone;
P-4VP: poly-4-vinylpyridine.

TABLE 4

| | | Cation-exchange group amount mmol/g-dry membrane | Cation-exchange group amount based on an ion exchange resin mmol/g-dry mass | Anion-exchange group amount mmol/g-dry membrane | Cation-exchange capacity mmol/g-dry membrane | Ion-complex amount % | Water content % | Membrane resistance $\Omega \cdot cm^2$ | Membrane thickness μm | Methanol permeability $g/m^2 \cdot hr$ | Fuel cell output voltage V | |
|---|---|---|---|---|---|---|---|---|---|---|---|---|
| | | | | | | | | | | | 0 A/cm² | 0.1 A/cm² |
| Comparative Example | 2 | 2.0 | 2.0 | 0.7 | 1.42 | 83 | 44 | 0.12 | 28 | Dissolved | 0.30 | 0 |
| | 3 | 1.9 | 1.9 | 1.2 | 0.95 | 79 | 26 | 0.28 | 26 | 1510 | 0.42 | 0.10 |

TABLE 5

| Example | Porous membrane | Composition (parts by mass) | | | | DVB (based on a monofunctional monomer, mol %) |
|---|---|---|---|---|---|---|
| | | St | CMS | DVB | PO | |
| 7 | A | 83 | 7 | 10 | 5 | 8.3 |
| 8 | A | 62 | 28 | 10 | 5 | 9.6 |

Porous membrane A: polyethylene having a weight average molecular weight of 250,000; film thickness: 25 μm; average pore diameter: 0.03 μm; porosity: 37%;
St: styrene;
CMS: chloromethylstyrene;
DVB: divinylbenzene;
PO: t-butylperoxyethyl hexanoate

TABLE 6

| | | Cation-exchange group amount mmol/g-dry membrane | Cation-exchange group amount based on an ion exchange resin mmol/g-dry mass | Anion-exchange group amount mmol/g-dry membrane | Cation-exchange capacity mmol/g-dry membrane | Ion-complex amount % | Water content % | Membrane resistance $\Omega \cdot cm^2$ | Membrane thickness μm | Methanol permeability $g/m^2 \cdot hr$ | Fuel cell output voltage V | |
|---|---|---|---|---|---|---|---|---|---|---|---|---|
| | | | | | | | | | | | 0 A/cm² | 0.1 A/cm² |
| Example | 7 | 2.0 | 4.7 | 0.2 | 1.8 | 99 | 26 | 0.12 | 28 | 500 | 0.77 | 0.34 |
| | 8 | 1.8 | 4.2 | 0.8 | 1.2 | 75 | 18 | 0.40 | 28 | 350 | 0.82 | 0.31 |

TABLE 7

| Example | Porous membrane | Composition (parts by mass) | | | | DVB (based on a monofunctional monomer, mol %) |
|---|---|---|---|---|---|---|
| | | St | VIm | DVB | PO | |
| 9 | A | 65 | 25 | 10 | 5 | 8.6 |
| 10 | A | 52 | 38 | 10 | 5 | 8.5 |
| 11 | A | 32 | 58 | 10 | 5 | 8.3 |
| 12 | A | 52 | 38 | 10 | 5 | 8.5 |

Porous membrane A: polyethylene having a weight average molecular weight of 250,000; film thickness: 25 μm; average pore diameter: 0.03 μm; porosity: 37%;
St: styrene;
VIm: 1-vinylimidazole;
DVB: divinylbenzene;
PO: t-butylperoxyethyl hexanoate Next, the ion exchange membrane was removed from the monomer composition; both sides of the cation-exchange membrane were covered by a 100 μm polyester film (releasing material); and under an nitrogen atmosphere in an autoclave, it was then polymerized by heating at 80° C. under a pressure of 0.29 MPa (3 kg/cm$^2$) for 5 hours. The resulting polymer was washed by immersing it in methanol for 2 hours to give a membrane for a fuel cell of the present invention.

For these membranes for a fuel cell were measured a cation-exchange group amount, a cation-exchange group amount based on an ion exchange resin, an anion-exchange group amount, a cation-exchange capacity, an ion-complex amount, a water content, a membrane resistance, a membrane thickness, a methanol permeability, a fuel cell output voltage,

TABLE 8

| Example | Cation-exchange group amount mmol/g-dry membrane | Cation-exchange group amount based on an ion exchange resin mmol/g-dry mass | Anion-exchange group amount mmol/g-dry membrane | Cation-exchange capacity mmol/g-dry membrane | Ion-complex amount % | Water content % | Membrane resistance Ω·cm$^2$ | Membrane thickness μm | Methanol permeability g/m$^2$·hr | Fuel cell output voltage V 0 A/cm$^2$ | 0.1 A/cm$^2$ |
|---|---|---|---|---|---|---|---|---|---|---|---|
| 9 | 1.8 | 4.3 | 0.2 | 1.7 | 50 | 18 | 0.16 | 26 | 500 | 0.77 | 0.32 |
| 10 | 1.6 | 3.8 | 0.3 | 1.4 | 67 | 16 | 0.25 | 25 | 260 | 0.84 | 0.30 |
| 11 | 1.2 | 2.9 | 0.7 | 0.6 | 86 | 13 | 0.47 | 25 | 80 | 0.86 | 0.25 |
| 12 | 1.5 | 3.6 | 0.6 | 1.1 | 67 | 16 | 0.34 | 26 | 160 | 0.85 | 0.28 |

Second Producing Process

Preparation Examples 1 to 3

In a 500 ml glass container was placed 400 g of each of the monomer compositions shown in Table 9, in which was then immersed a porous membrane shown in Table 1 (A or B, each 20 cm×20 cm).

Next, the porous membrane was removed from the monomer composition; both sides of the porous membrane were covered by a 100 μm polyester film (releasing material); and under an nitrogen atmosphere in an autoclave, it was then polymerized by heating at 80° C. under a pressure of 0.29 MPa (3 kg/cm$^2$) for 5 hours.

The film product obtained was immersed in a 1:1 mixture of 98% concentrated sulfuric acid and 90% or more pure chlorosulfonic acid at 40° C. for 60 min to give a cation-exchange membrane in which a crosslinking type cation-exchange resin was contained within a porous membrane.

Table 9 shows a cation-exchange capacity, a water content and a membrane resistance for the cation-exchange membranes prepared.

Examples 13 to 20

A cation-exchange membrane in Preparation Example 1 was dried at room temperature for 24 hours and then immersed in a liquid containing a polymerizable monomer having an ion-exchange group shown in Table 10 at room temperature for 30 mm.

and a content of a low molecular-weight compound having an anion-exchange group. The results are shown in Table 11.

Examples 21 and 22

In 50 g of a 0.5 mol/l solution of sodium hydroxide in a mixture of water and methanol (water: 50 mass %) was immersed 0.1 g of the fuel cell membrane of Example 19 or 20 at room temperature for 10 hours. After removing the membrane, it was washed with ion-exchange water and dried at room temperature for 10 hours to give a membrane for a fuel cell of the present invention.

The properties of the membranes for a fuel cell were shown in Table 11.

Examples 23 to 25

A cation-exchange membrane in Preparation Example 1 was dried at room temperature for 24 hours and then immersed in a liquid containing a polymerizable monomer having an ion-exchange group shown in Table 10 at room temperature for 30 min.

Next, the ion exchange membrane was removed from the monomer composition; both sides of the cation-exchange membrane were covered by a 100 μm polyester film (releasing material); and under an nitrogen atmosphere in an autoclave, it was then polymerized by heating at 80° C. under a pressure of 0.29 MPa (3 kg/cm$^2$) for 5 hours.

Then, 0.1 g of the resulting polymer was immersed in methanol for 2 hours and then immersed in 50 g of a 0.5 mol/l solution of sodium hydroxide in a mixture of water-methanol (water: 50 mass %) at room temperature for 10 hours. After removing the membrane, it was washed with ion-exchange water and dried at room temperature for 10 hours to give a membrane for a fuel cell of the present invention.

The properties of the membranes for a fuel cell were evaluated. The results are shown in Table 11.

Examples 26 and 27

Membranes for a fuel cell of the present invention were prepared as described in Example 13, except that the cation-exchange membrane of Preparation Example 2 or 3 was used and the polymerizable monomer composition shown in Table 10 was used.

The properties of the membranes for a fuel cell were evaluated. The results are shown in Table 11.

Comparative Examples 4 and 5

The cation-exchange membrane of Preparation Example 1 or 3 as such was used as a membrane for a fuel cell. Table 11 shows the evaluation results for the properties of these membranes for a fuel cell. The results obtained for the fuel cell membrane which was the cation-exchange membrane of Preparation Example 2 as such, are shown in Table 2.

Comparative Example 6

A membrane for a fuel cell was prepared as described in Example 13, except that Nafion 117 (DuPont) was used as an ion exchange membrane. The properties of this membrane for a fuel cell were evaluated. The results are shown in Table 11.

Comparative Examples 7 and 8

The cation-exchange membrane of Preparation Example 1 was immersed in a 1.0 mass % solution of a poly-4-vinylpyridine having a molecular weight shown in Table 12 in methanol at room temperature for 7 hours. Next, the cation-exchange membrane was removed from the solution, washed by immersing it in methanol for 2 hours, and then dried in vacuo at room temperature for 10 hours and at 40° C. for 5 hours to give a membrane for a fuel cell.

Table 13 shows the evaluation results for the properties of these membranes for a fuel cell.

Comparative Examples 9 and 10

Membranes for a fuel cell in which Nafion 117 (DuPont) was impregnated with a poly-4-vinylpyridine were prepared as described in Comparative Example 12, except that Nafion 117 was used.

Table 13 shows the evaluation results for the properties of these membranes for a fuel cell.

TABLE 9

| Preparation Example | porous membrane | Composition (parts by mass) | | | DVB (based on a monofunctional monomer, mol %) | Cation-exchange capacity mmol/g-dry membrane | Water content % | Membrane resistance $\Omega \cdot cm^2$ |
|---|---|---|---|---|---|---|---|---|
| | | St | DVB | PO | | | | |
| 1 | A | 100 | 3 | 5 | 2.4 | 2.5 | 33 | 0.05 |
| 2 | A | 100 | 10 | 5 | 8.0 | 2.4 | 29 | 0.08 |
| 3 | B | 100 | 10 | 5 | 8.0 | 2.6 | 30 | 0.07 |

Porous membranes A: polyethylene with a weight average molecular weight of 250,000; film thickness: 25 μm; average pore diameter: 0.03 μm; porosity: 37%; B: polyethylene with a weight average molecular weight of 200,000; film thickness: 16 μm; average pore diameter: 0.03 μm; porosity: 41%;
St: styrene;
DVB: divinylbenzene;
PO: t-butylperoxyethyl hexanoate.

TABLE 10

| Example | Ion exchange membrane | Composition (parts by mass) | | | | | | | | DVB (based on a monofunctional monomer, mol %) |
|---|---|---|---|---|---|---|---|---|---|---|
| | | 4VP | DMC | Vim | St | DVB | PO | Toluene | Pyridine | |
| 13 | Preparation Example 1 | 100 | 0 | 0 | 0 | 0 | 5 | 0 | 0 | 0 |
| 14 | Preparation Example 1 | 100 | 0 | 0 | 3 | 3 | 5 | 0 | 0 | 2.4 |
| 15 | Preparation Example 1 | 100 | 0 | 0 | 12 | 12 | 5 | 0 | 0 | 9.7 |
| 16 | Preparation Example 1 | 100 | 0 | 0 | 3 | 3 | 5 | 300 | 0 | 2.4 |
| 17 | Preparation Example 1 | 100 | 0 | 0 | 3 | 3 | 5 | 1000 | 100 | 2.4 |
| 18 | Preparation Example 1 | 0 | 100 | 0 | 3 | 3 | 5 | 0 | 100 | 4.8 |
| 19 | Preparation Example 1 | 80 | 0 | 0 | 500 | 20 | 50 | 400 | 200 | 2.8 |
| 20 | Preparation Example 1 | 80 | 0 | 0 | 700 | 20 | 50 | 200 | 200 | 2.1 |
| 23 | Preparation Example 1 | 0 | 0 | 90 | 0 | 10 | 5 | 900 | 200 | 9.0 |
| 24 | Preparation Example 1 | 0 | 0 | 80 | 500 | 20 | 50 | 400 | 200 | 2.8 |
| 25 | Preparation Example 1 | 0 | 0 | 80 | 900 | 20 | 50 | 0 | 200 | 1.6 |

TABLE 10-continued

| Ion exchange membrane | | Composition (parts by mass) | | | | | | | | DVB (based on a monofunctional monomer, mol %) |
|---|---|---|---|---|---|---|---|---|---|---|
| | | 4VP | DMC | VIm | St | DVB | PO | Toluene | Pyridine | |
| 26 | Preparation Example 2 | 100 | 0 | 0 | 0 | 3 | 5 | 300 | 0 | 2.4 |
| 27 | Preparation Example 3 | 100 | 0 | 0 | 0 | 3 | 5 | 300 | 0 | 2.4 |
| Comparative Example 11 | Nafion | 100 | 0 | 0 | 0 | 3 | 5 | 0 | 0 | 2.4 |

4VP: 4-vinylpyridine;
DMC: methylchloride salt of dimethylaminoethyl methacrylate;
VIm: 1-vinylimidazole;
St: styrene;
DVB: divinylbenzene;
PO: t-butylperoxyethyl hexanoate.

TABLE 11

| | | Cation-exchange group amount mmol/g-dry membrane | Cation-exchange group amount based on an ion exchange resin mmol/g-dry resin | Anion-exchange group amount mmol/g-dry membrane | Cation-exchange capacity mmol/g-dry membrane | Ion-complex amount % | Low-molecular weight compound content mmol/g-dry membrane | Water content % | Membrane resistance Ω·cm² | Membrane thickness μm | Methanol permeability g/m²·hr | Fuel cell output voltage V 0 A/cm² | 0.1 A/cm² |
|---|---|---|---|---|---|---|---|---|---|---|---|---|---|
| Example | 13 | 2.4 | 5.7 | 1.0 | 1.54 | 86 | 0.4 | 26 | 0.23 | 30 | 250 | 0.83 | 0.38 |
| | 14 | 2.4 | 5.7 | 1.5 | 1.04 | 91 | 0.3 | 22 | 0.32 | 31 | 110 | 0.87 | 0.40 |
| | 15 | 2.4 | 5.7 | 1.8 | 0.69 | 95 | 0.3 | 16 | 0.42 | 32 | 70 | 0.89 | 0.39 |
| | 16 | 2.4 | 5.7 | 2.0 | 0.45 | 97 | 0.4 | 20 | 0.32 | 32 | 70 | 0.89 | 0.39 |
| | 17 | 2.4 | 5.7 | 1.5 | 0.93 | 98 | 0.4 | 21 | 0.22 | 31 | 100 | 0.88 | 0.44 |
| | 18 | 2.4 | 5.7 | 1.6 | 0.76 | 100 | 0.5 | 27 | 0.32 | 32 | 200 | 0.84 | 0.38 |
| | 19 | 2.3 | 5.5 | 1.5 | 0.93 | 91 | 0.3 | 19 | 0.31 | 30 | 160 | 0.85 | 0.38 |
| | 20 | 2.2 | 5.2 | 1.4 | 0.94 | 90 | 0.3 | 20 | 0.35 | 30 | 100 | 0.88 | 0.39 |
| | 21 | 2.3 | 5.5 | 1.1 | 1.35 | 86 | 0.04 | 21 | 0.28 | 30 | 250 | 0.84 | 0.46 |
| | 22 | 2.2 | 5.2 | 1.0 | 1.33 | 87 | 0.01 | 22 | 0.32 | 30 | 120 | 0.89 | 0.45 |
| | 23 | 2.4 | 5.7 | 1.2 | 1.25 | 96 | 0.04 | 22 | 0.31 | 31 | 150 | 0.87 | 0.42 |
| | 24 | 2.3 | 5.5 | 1.4 | 1.02 | 91 | 0.01 | 19 | 0.40 | 31 | 90 | 0.89 | 0.40 |
| | 25 | 2.3 | 5.5 | 1.4 | 1.03 | 91 | 0.01 | 16 | 0.46 | 32 | 60 | 0.90 | 0.32 |
| | 26 | 2.4 | 5.7 | 1.5 | 0.95 | 97 | 0.3 | 19 | 0.35 | 30 | 90 | 0.88 | 0.39 |
| | 27 | 2.4 | 5.6 | 1.5 | 0.98 | 94 | 0.3 | 20 | 0.29 | 21 | 120 | 0.87 | 0.42 |
| Comp. Exam. | 4 | 2.4 | 5.7 | 0 | 2.4 | — | 0 | 39 | 0.06 | 32 | 1300 | 0.58 | 0.23 |
| | 5 | 2.4 | 5.6 | 0 | 2.4 | — | 0 | 30 | 0.05 | 20 | 1150 | 0.59 | 0.26 |
| | 6 | 0.8 | 0.8 | 0.7 | 0.1 | 100 | 0.5 | 17 | 90 | 200 | 1070 | 0.21 | 0 |

TABLE 12

| Comparative Example | Cation-exchange membrane | Poly-4-vinylpyridine |
|---|---|---|
| 7 | Preparation Example 1 | P1 |
| 8 | Preparation Example 1 | P2 |
| 9 | Nafion117 | P1 |
| 10 | Nafion117 | P2 |

P1: molecular weight: 5,000, Aldrich;
P2: molecular weight: 60,000, Aldrich.

TABLE 13

| Comparative Example | Cation-exchange group amount mmol/g-dry membrane | Cation-exchange group amount based on an ion exchange resin mmol/g-dry resin | Anion-exchange group amount mmol/g-dry membrane | Cation-exchange capacity mmol/g-dry membrane | Ion-complex amount % | Water content % | Membrane resistance $\Omega \cdot cm^2$ | Membrane thickness μm | Methanol permeability $g/m^2 \cdot hr$ | Fuel cell output voltage V 0 A/cm² | Fuel cell output voltage V 0.1 A/cm² |
|---|---|---|---|---|---|---|---|---|---|---|---|
| 7 | 2.4 | 5.7 | 0.6 | 2.3 | 17 | 25 | 0.08 | 33 | 900 | 0.60 | 0.26 |
| 8 | 2.4 | 5.7 | 0.6 | 2.3 | 17 | 26 | 0.08 | 33 | 1100 | 0.58 | 0.24 |
| 9 | 0.8 | 0.8 | 0.8 | 0.06 | 93 | 22 | 250 | 190 | 60 | 0.10 | 0 |
| 10 | 0.8 | 0.8 | 0.6 | 0.2 | 100 | 25 | 1.2 | 200 | 1300 | 0.13 | 0.01 |

The invention claimed is:

1. A membrane for a fuel cell in which voids in a porous membrane are filled with a crosslinking type ion exchange resin having both cation-exchange group and anion-exchange group via a covalent bond, wherein the ion exchange resin has ion-exchange groups with either polarity more than ion-exchange groups with the opposite polarity and at least 40% of the ion-exchange groups of the opposite polarity form ion complexes with the ion-exchange groups of the major polarity.

2. The membrane for a fuel cell as claimed in claim 1, wherein the ion-exchange group with a major polarity is a cation-exchange group and the ion-exchange group with the opposite polarity is an anion-exchange group.

3. The membrane for a fuel cell as claimed in claim 2, wherein the cation-exchange group is a sulfonic acid group and the anion-exchange group is an anion-exchange group containing a primary to tertiary nitrogen atom.

4. The membrane for a fuel cell as claimed in claim 3, wherein the anion-exchange group containing a primary to tertiary nitrogen atom is an imidazolyl group.

5. The membrane for a fuel cell as claimed in claim 3, wherein the anion-exchange group containing a primary to tertiary nitrogen atom is a pyridyl group.

6. The membrane for a fuel cell as claimed in claim 1, wherein the amount of the ion-exchange group having a major polarity is less than 4.8 mmol/g-dry mass based on the ion exchange resin filling the voids in the porous membrane.

7. The membrane for a fuel cell as claimed in claim 1, wherein the crosslinking type ion exchange resin is a resin comprising crosslinked polymer chains where both cation-exchange and anion-exchange groups are covalently bound in a random manner.

8. The membrane for a fuel cell as claimed in claim 1, wherein the amount of the ion-exchange group with a major polarity is 4.8 mmol/g-dry mass or more based on the ion exchange resin filling the voids in the porous membrane.

9. The membrane for a fuel cell as claimed in claim 1, wherein the content of the low molecular-weight compound having an ion-exchange group with the opposite polarity is 0.05 mmol/g-dry mass or less as the amount of the ion-exchange group.

10. The membrane for a fuel cell as claimed in claim 1, wherein the crosslinking type ion exchange resin is comprised of a mixture of a resin comprising crsslinked polymer chains where an ion-exchange group either cation-exchange group or anion-exchange group is covalently bound, and a resin comprising polymer chains where an ion-exchange group with the opposite polarity to the ion-exchange group of the major resin component is covalently bound.

11. The membrane for a fuel cell as claimed in claim 1, wherein the fuel cell is a direct methanol type fuel cell.

12. A process for producing a membrane for a fuel cell according to claim 1, comprising the steps of contacting a porous membrane with a polymerizable composition containing a polymerizable monomer in which cation-exchange-group introducible functional groups or cation-exchange groups are covalently bound, a polymerizable monomer in which anion-exchange-group introducible functional groups or anion-exchange groups are covalently bound, a crosslinking agent and a polymerization initiator to impregnate the voids in the porous membrane with the polymerizable composition; then polymerizing and curing the impregnated polymerizable composition; then introducing, if necessary, cation-exchange groups and/or anion-exchange groups to the cation-exchange-group or anion-exchange-group introducible functional groups such that ion-exchange groups with either polarity become more than ion-exchange groups with the opposite polarity.

13. The process for producing a membrane for a fuel cell as claimed in claim 12, comprising the steps of contacting a porous membrane with a polymerizable composition containing a polymerizable monomer in which an aromatic hydrocarbon group is covalently bound, a polymerizable monomer in which an anion-exchange group containing a primary to tertiary nitrogen atom is covalently bound, a crosslinking agent and a polymerization initiator to impregnate the voids in the porous membrane with the polymerizable composition; then polymerizing and curing the impregnated polymerizable composition; then introducing a sulfonic acid group to the aromatic hydrocarbon group such that it becomes more than the anion-exchange group containing a primary to tertiary nitrogen atom.

14. The process for producing a membrane for a fuel cell as claimed in claim 13, wherein the polymerizable monomer in which an aromatic hydrocarbon group is covalently bound is a styrene type monomer, and the polymerizable monomer in which the anion-exchange group containing a primary to tertiary nitrogen atom is covalently bound is a vinylimidazole type monomer.

15. The process for producing a membrane for a fuel cell as claimed in claim 13, wherein the polymerizable monomer in which an aromatic hydrocarbon group is covalently bound is a styrene type monomer, and the polymerizable monomer in which the anion-exchange group containing a primary to tertiary nitrogen atom is covalently bound is a vinylpyridine type monomer.

16. A membrane for a fuel cell manufactured by the process as claimed in claim 12.

17. A process for producing a membrane for a fuel cell according to claim 1, comprising the steps of contacting a base ion-exchange membrane in which voids in a porous membrane are filled with a crosslinking type ion exchange resin having covalently bound cation-exchange groups or anion-exchange groups with a polymerizable monomer having covalently bound ion-exchange groups with the opposite polarity to that of the ion-exchange groups in the base ion-exchange membrane to impregnate the crosslinking type ion-exchange resin with the polymerizable monomer, and then polymerizing the impregnated polymerizable monomer.

18. The process for producing a membrane for a fuel cell as claimed in claim 17, wherein the ion exchange resin filling the voids in the porous membrane is a crosslinking type cation-exchange resin having a covalently bound cation-exchange group, to which is impregnated with a polymerizable monomer having a covalently bound anion-exchange group.

19. The process for producing a membrane for a fuel cell as claimed in claim 18, wherein the cation-exchange group covalently bound to the crosslinking type cation-exchange resin is a sulfonic acid group and the polymerizable monomer having the covalently bound anion-exchange group is a polymerizable monomer having a covalently bound anion-exchange group containing a primary to tertiary nitrogen atom.

20. The process for producing a membrane for a fuel cell as claimed in claim 19, wherein the polymerizable monomer having a covalently bound anion-exchange group containing a primary to tertiary nitrogen atom is a vinylimidazole type monomer.

21. The process for producing a membrane for a fuel cell as claimed in claim 19, wherein the polymerizable monomer having a covalently bound anion-exchange group containing a primary to tertiary nitrogen atom is a vinylpyridine type monomer.

22. The process for producing a membrane for a fuel cell as claimed in claim 17, comprising the step of, after polymerizing the polymerizable monomer in which the ion-exchange group with the opposite polarity is covalently bound, washing the product with an acidic or basic solution.

23. A membrane for a fuel cell manufactured by the process as claimed in claim 17.

* * * * *